US010949715B1

(12) United States Patent
Berlin et al.

(10) Patent No.: US 10,949,715 B1
(45) Date of Patent: Mar. 16, 2021

(54) METHODS AND SYSTEMS FOR IMAGE AND VOICE PROCESSING

(71) Applicant: Neon Evolution Inc., Los Angeles, CA (US)

(72) Inventors: Cody Gustave Berlin, Marina Del Rey, CA (US); Carl Davis Bogan, III, Los Angeles, CA (US); Kenneth Michael Lande, Los Angeles, CA (US); Jacob Myles Laser, Los Angeles, CA (US); Brian Sung Lee, Los Angeles, CA (US); Anders Øland, Hurup Thy (DK)

(73) Assignee: Neon Evolution Inc., Los Angeles, CA (US)

( * ) Notice: Subject to any disclaimer, the term of this patent is extended or adjusted under 35 U.S.C. 154(b) by 0 days.

(21) Appl. No.: 16/884,485

(22) Filed: May 27, 2020

Related U.S. Application Data

(63) Continuation-in-part of application No. 16/700,684, filed on Dec. 2, 2019, now Pat. No. 10,671,838.
(Continued)

(51) Int. Cl.
*G06K 9/00* (2006.01)
*G06K 9/62* (2006.01)
(Continued)

(52) U.S. Cl.
CPC ....... *G06K 9/6256* (2013.01); *G06K 9/00268* (2013.01); *G06K 9/00302* (2013.01);
(Continued)

(58) Field of Classification Search
CPC ............. G06K 9/6256; G06K 9/00268; G06K 9/00302; G06T 1/20; G06T 7/32; G06T 2207/20081
See application file for complete search history.

(56) References Cited

U.S. PATENT DOCUMENTS 6,263,113 B1    7/2001   Abdel-Mottaleb
6,611,613 B1    8/2003   Kang
(Continued)

FOREIGN PATENT DOCUMENTS

WO     WO 2017136784 A1    8/2017

OTHER PUBLICATIONS

Ahn, "Voice Conversion with Non-Parallel Data", from GitHub—andabi/deep-voice-conversion: Deep neural networks for voice conversion (voice style transfer) in Tensorflow, article publication date Nov. 2, 2017, webpage printed on Nov. 25, 2019, 4 pages.
(Continued)

*Primary Examiner* — Solomon G Bezuayehu
(74) *Attorney, Agent, or Firm* — Knobbe, Martens, Olson & Bear LLP

(57) ABSTRACT

Systems and methods are disclosed configured to train an autoencoder using images that include faces, wherein the autoencoder comprises an input layer, an encoder configured to output a latent image from a corresponding input image, and a decoder configured to attempt to reconstruct the input image from the latent image. An image sequence of a face exhibiting a plurality of facial expressions and transitions between facial expressions is generated and accessed. Images of the plurality of facial expressions and transitions between facial expressions are captured from a plurality of different angles and using different lighting. An autoencoder is trained using source images that include the face with different facial expressions captured at different angles with different lighting, and using destination images that include a destination face. The trained autoencoder is used to generate an output where the likeness of the face in the destination images is swapped with the likeness of the source face, while preserving expressions of the destination face.

30 Claims, 14 Drawing Sheets

Related U.S. Application Data which is a continuation-in-part of application No. 16/544,673, filed on Aug. 19, 2019, now Pat. No. 10,552,667.

(51) Int. Cl.
  *G06T 1/20* (2006.01)
  *G06T 7/32* (2017.01)

(52) U.S. Cl.
  CPC .................. *G06T 1/20* (2013.01); *G06T 7/32* (2017.01); *G06T 2207/20081* (2013.01)

(56) References Cited

U.S. PATENT DOCUMENTS

| | | | |
|---|---|---|---|
| 6,970,817 B2 | 11/2005 | Ross | |
| 6,985,857 B2 | 1/2006 | Adut | |
| 7,389,001 B2 | 6/2008 | Messerman | |
| 7,446,799 B2 | 11/2008 | Suzuki | |
| 7,627,370 B2 | 12/2009 | Marks | |
| 7,684,982 B2 | 3/2010 | Taneda | |
| 7,972,266 B2 | 7/2011 | Gobeyn | |
| 8,045,418 B2 | 10/2011 | Suzuki | |
| 8,055,018 B2 | 11/2011 | Han | |
| 8,345,114 B2 | 1/2013 | Ciuc | |
| 8,447,191 B2 | 5/2013 | Li | |
| 8,494,338 B2 | 7/2013 | Murabayashi | |
| 8,498,456 B2 | 7/2013 | Legagneur | |
| 8,553,037 B2 | 10/2013 | Smith | |
| 8,831,293 B2 | 9/2014 | Wolf | |
| 9,036,917 B2 | 5/2015 | Kaneda | |
| 9,444,434 B1 | 9/2016 | Tanase | |
| 9,665,955 B1 * | 5/2017 | Meyer ..................... G06T 11/20 |
| 10,552,667 B1 * | 2/2020 | Bogan, III ........... G06K 9/6262 |
| 10,658,005 B1 * | 5/2020 | Bogan, III ........... G06K 9/6256 |
| 10,671,838 B1 * | 6/2020 | Bogan, III ............. G06T 13/40 |
| 2004/0034611 A1 | 2/2004 | Kee et al. | |
| 2007/0237421 A1 | 10/2007 | Luo | |
| 2009/0310828 A1 | 12/2009 | Kakadiaris et al. | |
| 2011/0123118 A1 | 5/2011 | Nayar et al. | |
| 2013/0336600 A1 | 12/2013 | Bitouk et al. | |
| 2014/0204084 A1 * | 7/2014 | Corazza ................. G06T 13/40 345/420 |
| 2016/0240187 A1 | 8/2016 | Fleizach et al. | |
| 2016/0364633 A1 | 12/2016 | Yang et al. | |
| 2017/0004397 A1 | 1/2017 | Yumer et al. | |
| 2017/0024921 A1 * | 1/2017 | Beeler ..................... G06T 13/40 |
| 2018/0293496 A1 * | 10/2018 | Vogels ................. G06K 9/6298 |
| 2019/0005305 A1 | 1/2019 | Huang | |
| 2019/0130278 A1 | 5/2019 | Karras | |
| 2019/0206101 A1 | 7/2019 | De la Torre et al. | |
| 2019/0295302 A1 * | 9/2019 | Fu ......................... G06N 3/0454 |
| 2020/0143137 A1 * | 5/2020 | Gottemukkula ... G06K 9/00892 |
| 2020/0218984 A1 * | 7/2020 | Thornton .............. H04L 9/3247 |
| 2020/0228692 A1 * | 7/2020 | Wakamatsu .......... H04N 5/2256 |
| 2020/0334853 A1 * | 10/2020 | Ciuc ...................... G06T 13/40 |

OTHER PUBLICATIONS

Desai et al., "Voice Conversion Using Artificial Neural Networks," International Institute of Information Technology—Hyderabad, India and Language Technologies Institute, Carnegie Mellon University, USA, ICASSP '09 Proceedings of the 2009 IEEE International Conference on Acoustics, Speech and Signal Processing, pp. 3893-3896, Apr. 19, 2009, 4 pages.

Generative Face Completion, Li et al., 2017 IEEE Conference on Computer Vision and Pattern Recognition (Year: 2017).

Güera, et al., "Deepfake Video Detection Using Recurrent Neural Networks," Video and Image Processing Laboratory (VIPER), Purdue University, 6 pages, Nov. 2018 https://engineering.purdue.edu/~dqueraco/content/deepfake.pdf.

Koch et al., "Siamese Neural Networks for One-shot Image Recognition," *Proceedings of the 32ndInternational Conference on Machine Learning*, Lille, France, 2015, JMLR: W&CP vol. 37, 8 pages.

Youtube video: "I used 'deep fakes' to fix the Lion King," Aug. 8, 2019, https://www.youtube.com/watch?v=Y1HGglCgZ3c&feature=youtu.be.

* cited by examiner

METHODS AND SYSTEMS FOR IMAGE AND VOICE PROCESSING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This document relates to systems and techniques for digital image and voice processing.

Description of the Related Art

Conventional techniques for processing computer generated videos may require large amounts of computer resources, take an inordinate amount of time. Hence, more computer resource-efficient and time-efficient techniques are needed to perform advanced forms of digital image processing, such as face-swapping.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate systems and methods configured to train an autoencoder using images that include faces, wherein the autoencoder comprises an input layer, an encoder configured to output a latent image from a corresponding input image, and a decoder configured to attempt to reconstruct the input image from the latent image. An image sequence of a CGI sculpted and textured face exhibiting a plurality of facial expressions and transitions between facial expressions is accessed. Images of the plurality of facial expressions and transitions between facial expressions are captured from a plurality of different angles. The autoencoder is trained using source images that include a CGI face with different facial expressions captured at different angles, and using destination images that include a real face (e.g., a photograph or video of a person's face). The trained autoencoder is used to generate an output where the real face in the destination images is swapped with the CGI face, while preserving expressions of the real face. Optionally, instead of using images of a face from multiple angles, images from relatively few angles may be used (e.g., a single frontal or side facial image).

Optionally, a one-shot (or few shot) architecture (where one or a few example images (e.g., 1-100 images) are used to classify many new examples in the future), comprising multiple neural networks performing different tasks, may be utilized to reduce the number of images needed to perform a face swap, where the likeness of a source face is applied to a destination image. This is in contrast to certain conventional architectures, which may need hundreds or thousands of facial images for training and face swapping purposes.

In addition, aspects of the present disclosure relate to systems and methods configured to swap a first voice in an audio recording with a second voice while maintaining the text/sentence structure, inflection, and other features from the original audio recording. For example, an autoencoder (e.g., comprising one or more neural networks) may be trained using voice samples. The autoencoder may include an input layer, an encoder configured to output latent voice data from corresponding input voice data, and a decoder configured to attempt to reconstruct the input voice data from the latent voice data. An autoencoder neural network may be trained using frame error (FE) minimization criteria and back propagation, and the corresponding neural network weights may be adjusted to minimize or reduce the error (e.g., the error squared over the source-target, training data set).

A source voice file exhibiting a plurality of vocal expressions and transitions between vocal expressions may be accessed (e.g., publically available voice samples or custom or specially made voice samples). For example, the voice file may a subject dramatically reading a book, script, or the like. The voice file may be specifically generated to include all standard phonemes in a selected language (e.g., about 44 phonemes for the English language, about 35 for Mandarin language, about 48 for Hindustani). The voice file may be specifically generated to include someone speaking with different emotions (as reflected in the speaker's emotional prosody), intonations, and sounds (anger, laughter, happy, desire, awe, fear, amusement, deadpan, serious, cough, yawn, etc.). For example, emotional prosody (the ability to express emotions through variations of different parameters of the human speech) may be characterized as a speaker's tone of voice in speech that is conveyed through changes in pitch contour (rise and fall of the voice pitch), loudness (related to the amplitude of sound waves), intensity (related to rate of energy transfer per unit area), timbre, speech rate, and/or pause. The autoencoder may be trained using one or more source voice files (e.g., of many different voices) and using a destination voice file (e.g., of a destination voice dramatically reading a book, script, or the like). Optionally, source and target speakers record the same or substantially the same set of utterances for the respective training sets. The trained autoencoder is used to generate an output where the voice in the destination voice recording is swapped with the source voice, while preserving text and expressions of the destination voice.

An aspect of the present disclosure relates to an electronic image processing system, comprising: a network interface; at least one computing device; computer readable memory including instructions operable to be executed by the at least one computing device to perform a set of actions, configuring the at least one computing device: provide computer graphics animation resources configured to enable a user to generate computer graphic imagery (CGI) faces by: sculpting at least a face; adding texture to the face; animating the face to exhibit a plurality of facial expressions and transitions between facial expressions; use one or more virtual cameras to capture images of the plurality of facial expressions and transitions between facial expressions from a plurality of different angles; pre-train an autoencoder using images that include faces, wherein the autoencoder comprises: an input layer; an encoder including at least one hidden layer that optionally has fewer nodes than the input layer to thereby constrain recreation of an input image by the encoder, wherein the encoder is configured to output a latent image from a corresponding input image; a decoder configured to attempt to reconstruct the input image from the latent image; train the pre-trained autoencoder using source images that include a first CGI face with different facial expressions captured at different angles, and using destination images that include a first real face; and use the trained autoencoder to generate an output using destination images as an input where the first real face in the destination images is swapped with the first CGI face, while preserving expressions of the first real face.

An aspect of the present disclosure relates to a system, comprising: a network interface; at least one computing device; computer readable memory including instructions operable to be executed by the at least one computing device to perform a set of actions, configuring the at least one computing device: access a source data set comprising an image sequence of a first computer graphic imagery (CGI) sculpted and textured face exhibiting a plurality of facial expressions and transitions between facial expressions; capture images of the plurality of facial expressions and transitions between facial expressions from a plurality of different angles; train an autoencoder using: source images that include the first CGI face with different facial expressions captured at different angles, and destination images that include a first real face, wherein the autoencoder comprises: an input layer; an encoder including at least one hidden layer that optionally has fewer nodes than the input layer to thereby constrain recreation of an input image by the encoder, wherein the encoder is configured to output a latent image from a corresponding input image; a decoder configured to attempt to reconstruct the input image from the latent image; and use the trained autoencoder to generate an output where the first real face in the destination images is swapped with the first CGI face, while preserving expressions of the first real face.

An aspect of the present disclosure relates to a computer implemented method comprising: under control of a hardware computing device configured with specific computer executable instructions: accessing a source data set comprising an image sequence of a first computer graphic imagery (CGI) sculpted and textured face exhibiting a plurality of facial expressions and transitions between facial expressions; capturing images of the plurality of facial expressions and transitions between facial expressions of the first CGI face from a plurality of different angles; training an autoencoder using: source images that include the first CGI face with different facial expressions captured at different angles, and destination images that include a first real face, wherein the autoencoder comprises: an input layer; an encoder including at least one hidden layer that optionally has fewer nodes than the input layer, wherein the encoder is configured to output a latent image from a corresponding input image; a decoder configured to attempt to reconstruct the input image from the latent image; and using the trained autoencoder to generate an output using the destination images, where the first real face in the destination images is swapped with the first CGI face, while preserving expressions of the first real face.

An aspect of the present disclosure relates to an electronic image processing system, comprising: a network interface; at least one computing device; computer readable memory including instructions operable to be executed by the at least one computing device to perform a set of actions, configuring the at least one computing device to: access captured images of a plurality of facial expressions of a first CGI face and transitions between facial expressions from a plurality of different angles, wherein the captured images are captured to train autoencoders; pre-train an autoencoder using a plurality of facial images, wherein the autoencoder comprises: an input layer; an encoder including at least one hidden layer that optionally has fewer nodes than the input layer to thereby constrain recreation of an input image by the encoder, wherein the encoder is configured to output a latent image from a corresponding input image; a decoder configured to attempt to reconstruct the input image from the latent image; train the pre-trained autoencoder using the captured source images that include the first CGI face with different facial expressions captured at different angles, and using destination images that include a first real face; and use the trained autoencoder to generate an output using destination images as an input where the first real face likeness in the destination images is swapped with the likeness of the first CGI face, while preserving expressions of the first real face.

An aspect of the present disclosure relates to a computer implemented method comprising: under control of a hardware computing device configured with specific computer executable instructions: generating a training source data set to train an autoencoder, the training source data set comprising facial images of a source face from a plurality of different angles, with a variety of different lighting characteristics, the source facial images exhibiting a plurality of facial expressions and transitions between facial expressions; training the autoencoder using: the generated training source data set source images comprising facial images of a source face from a plurality of different angles, with a variety of different lighting characteristics, the source facial images exhibiting a plurality of facial expressions and transitions between facial expressions, and destination images that include a destination face, wherein the autoencoder comprises: an input layer; an encoder including at least one hidden layer that optionally has fewer nodes than the input layer, wherein the encoder is configured to output a latent image from a corresponding input image; a decoder configured to attempt to reconstruct the input image from the latent image; and using the trained autoencoder to generate an output using the destination images, where the destination face likeness in the destination images is swapped with the source face likeness, while preserving expressions of the destination face.

An aspect of the present disclosure relates to an electronic image processing system, comprising: at least one computing device; computer readable memory including instructions operable to be executed by the at least one computing device to perform a set of actions, configuring the at least one computing device to: access a training set of source images, the training set of source images comprising facial images of a source face from a plurality of different angles, with a variety of different lighting characteristics, the source facial images exhibiting a plurality of facial expressions and transitions between facial expressions; determining an alignment difference between at least one source image in the training set of source images and at least one destination image; and based at least on the determined alignment difference, determine if an additional image is to be obtained for the training set of source images; based at least in part on determining that an additional image is to be obtained for the training set of source images, access the additional image; train an autoencoder using at least a portion of the training set of source images, wherein the autoencoder comprises: an input layer; an encoder including at least one hidden layer that optionally has fewer nodes than the input layer to thereby constrain recreation of an input image by the encoder, wherein the encoder is configured to output a latent image from a corresponding input image; a decoder configured to attempt to reconstruct the input image from the latent image; and use the trained autoencoder to generate an output using destination images comprising a destination face as an input where the destination face likeness in the destination images is swapped with the likeness of the source face, while preserving expressions of the destination face.

An aspect of the present disclosure relates to an electronic image processing system, comprising: a segmentation neural network configured to detect a face in digital images and associate a face indication with detected faces; a generator neural network configured to synthesize a face and swap a source face likeness from a corresponding source image to a destination face in a corresponding destination image, wherein an expression of the destination face is preserved; a discriminator network configured to determine a probability that a face in an image is a real face or a synthesized face and provide a corresponding output to the generator neural network, wherein weights of the generator neural network are adjusted during training of the generator neural network based at least in part on the discriminator output; and an inpainting neural network configured receive an output from the generator neural network, the generator neural network output comprising at least a first reconstructed destination image having the source face likeness and the expression of the destination face, wherein the inpainting network is configured to fill in missing pixels and/or perform background replacement in the first reconstructed image and output an inpainted first reconstructed image.

An aspect of the present disclosure relates to a computer implemented method comprising: performing training on a generative adversarial network comprising a generator learning network and a discriminator learning network; providing the trained generative adversarial network with a source image comprising an image of at least a source face; providing the trained generative adversarial network with a destination image comprising at least a destination face of a first entity; using the trained generative adversarial network to generate an image of the first entity with the likeness of the source face, where an expression of the destination face is preserved; and using an image correction learning network to automatically perform inpainting and/or background replacement on the image generated by the generative adversarial network.

An aspect of the present disclosure relates to an electronic image and voice processing system, comprising: a network interface; at least one computing device; computer readable memory including instructions operable to be executed by the at least one computing device to perform a set of actions, configuring the at least one computing device to: use one or more microphones to generate a source voice training set, wherein the one or more microphones are used to capture a source voice speaking a plurality of words using varying speech parameters, wherein the captured source voice is captured to train autoencoders; train an autoencoder using the source voice training set, wherein the autoencoder comprises: an input layer; an encoder including at least one hidden layer that optionally has fewer nodes than the input layer to thereby constrain recreation of an input voice by the encoder, wherein the encoder is configured to output a latent voice from a corresponding input voice; a decoder configured to attempt to reconstruct the input voice from the latent voice; train the autoencoder using a destination voice speaking words using varying speech parameters; and access audio/video media comprising a video track and an audio track, wherein the audio track include the destination voice speaking words and the video track includes images of a destination face having lips synchronized with the destination voice; use the trained autoencoder to generate a modified audio track using the destination voice in the audio track as an input, where the destination voice is swapped with the source voice, while preserving the words of the destination voice, so that the source voice is speaking the words of the destination voice; use a face swapping network to generate a modified video track wherein the face swapping network replaces the destination face likeness with a source face likeness with preserving the facial expressions of the destination face; and generate a modified audio/video media comprising the modified video track and the modified audio track.

An aspect of the present disclosure relates to a computer implemented method comprising: under control of a hardware computing device configured with specific computer executable instructions: accessing a source voice data set of a first person speaking words using varying speech parameters; accessing a destination voice data set of a second person speaking words using varying speech parameters; training an autoencoder using: the source voice data set of the first person speaking words using varying speech parameters, and the destination voice data set of a second person speaking words using varying speech parameters, wherein the autoencoder comprises: an input layer; an encoder including at least one hidden layer that optionally has fewer nodes than the input layer, wherein the encoder is configured to output a latent voice from a corresponding input voice; a decoder configured to attempt to reconstruct the input voice from the latent voice; accessing audio/video media comprising a video track and an audio track, wherein the audio track include the destination voice speaking words and the video track includes synchronized images of a destination face; using the trained autoencoder to generate a modified audio track output using the destination voice in the audio track as an input, where the destination voice is swapped with the source voice, while preserving the words of the destination voice, so that the source voice is speaking the words of the destination voice; using a face swapping network to generate a modified video track wherein the face swapping network replaces the destination face likeness with a source face likeness with preserving the facial expressions of the destination face; and generating a modified audio/video media comprising the modified video track and the modified audio track.

An aspect of the present disclosure relates to an electronic image and voice processing system, comprising: at least one computing device; computer readable memory including instructions operable to be executed by the at least one computing device to perform a set of actions, configuring the at least one computing device to: implement an autoencoder comprising: an input layer; an encoder including at least one hidden layer that optionally has fewer nodes than the input layer to thereby constrain recreation of an input voice by the encoder, wherein the encoder is configured to output a latent voice from a corresponding input voice; a decoder configured to attempt to reconstruct the input voice from the latent voice; train the autoencoder using a source voice speaking words using varying speech parameters, and using a destination voice speaking words using varying speech parameters; access audio/video media comprising a video track and an audio track, wherein the audio track include the destination voice speaking words and the video track includes images of a destination face having lips synchronized with the destination voice; use the trained autoencoder to generate a modified audio track output using the destination voice in the audio track as an input, where the destination voice is swapped with the source voice, while preserving the words of the destination voice, so that the source voice is speaking the words of the destination voice; use a face swapping network to generate a modified video track wherein the face swapping network replaces the destination face likeness with a source face likeness with preserving the facial expressions of the destination face; and generate a modified audio/video media comprising the modified video track and the modified audio track.

An aspect of the present disclosure relates to an electronic image processing system, comprising: a network interface; at least one computing device; computer readable memory including instructions operable to be executed by the at least one computing device to perform a set of actions, configuring the at least one computing device to: access captured images of a plurality of facial expressions of a first CGI face and transitions between facial expressions from a plurality of different angles, wherein the captured images are captured to train autoencoders; train a pre-trained autoencoder using the captured images that include the first CGI face with different facial expressions captured at different angles, and using destination images that include a first real face, wherein the autoencoder comprises: an input layer; an encoder including at least one hidden layer; wherein the encoder is configured to output a latent image from a corresponding input image; a decoder configured to attempt to reconstruct the input image from the latent image; and use the trained autoencoder to generate an output using destination images as an input where the first real face likeness in the destination images is swapped with the likeness of the first CGI face, while preserving expressions of the first real face.

An aspect of the present disclosure relates to a computer-implemented method comprising: under control of a hardware computing device configured with specific computer-executable instructions: 'training an autoencoder using: a generated training source data set source images comprising facial images of a source face from a plurality of different angles and/or with a variety of different lighting characteristics, the source facial images exhibiting a plurality of facial expressions and transitions between facial expressions, and destination images that include a destination face, wherein the autoencoder comprises: an input layer; an encoder including at least one hidden layer, wherein the encoder is configured to output a latent image from a corresponding input image; a decoder configured to attempt to reconstruct the input image from the latent image; and using the trained autoencoder to generate an output using the destination images, where the destination face likeness in the destination images is swapped with the source face likeness, while preserving expressions of the destination face.

An aspect of the present disclosure relates to an electronic image processing system, comprising: at least one computing device; computer readable memory including instructions operable to be executed by the at least one computing device to perform a set of actions, configuring the at least one computing device to: access a training set of source images, the training set of source images comprising facial images of a source face from a plurality of different angles and/or with a variety of different lighting characteristics, the source facial images exhibiting a plurality of facial expressions and transitions between facial expressions; determining an alignment difference between at least one source image in the training set of source images and at least one destination image; and based at least on the determined alignment difference, determine if an additional image is to be obtained for the training set of source images; based at least in part on determining that an additional image is to be obtained for the training set of source images, access the additional image; and use a trained autoencoder to generate an output using destination images comprising a destination face as an input where the destination face likeness in the destination images is swapped with the likeness of the source face, while preserving expressions of the destination face, wherein the trained the autoencoder comprises: an input layer; an encoder including at least one hidden layer, wherein the encoder is configured to output a latent image from a corresponding input image; a decoder configured to attempt to reconstruct the input image from the latent image.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1:
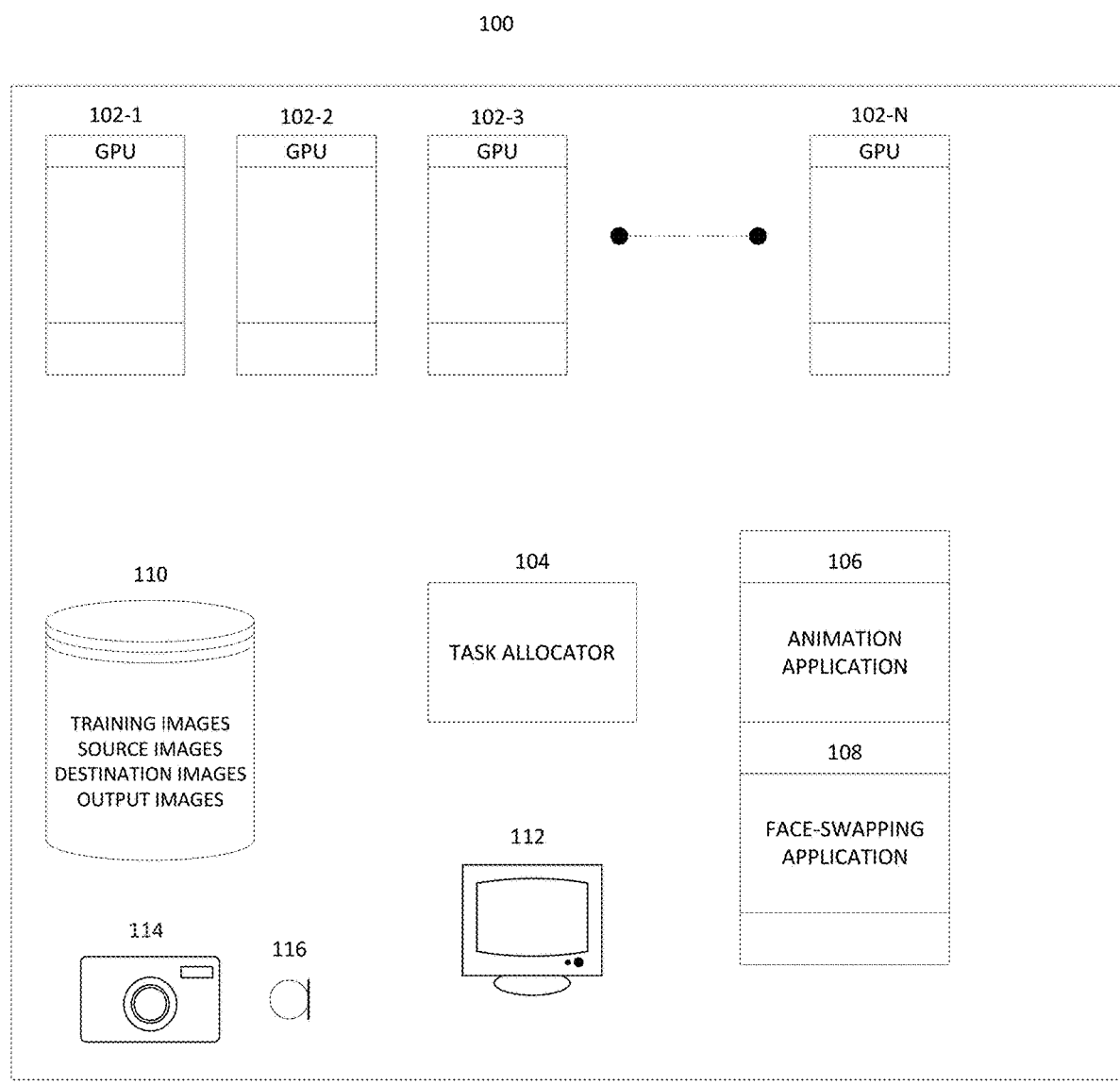
FIG. 1 illustrates an example architecture.

As discussed above, conventional techniques for processing computer generated videos require large amounts of computer resources and take an inordinate amount of time. Further, certain relatively new applications for digital image processing, such as face-swapping, are becoming ever more popular, creating further demand for computer resources.

Conventionally, face-swapping is performed by capturing an image or a video of a person (sometimes referred to as the source) whose face is to be used to replace a face of another person in a destination video. For example, a face region in the source image and target image may be recognized, and the face region from the source may be used to replace the face region in the destination, and an output image/video is generated. The source face in the output preserves the expressions of the face in the original destination image/video (e.g., has lip motions, eye motions, eyelid motions, eyebrow motions, nostril flaring, etc.). If insufficient computer resources and/or time are made available to perform the face swapping the output may fail on one or more looks or movements. Further, conventional techniques lack the capability to generate output content in high resolution (HD (about 1920×1080 pixels, 1280×720 pixels, or 1366×768 pixels), 4K UHD (about 3840×2160 pixels), 4K (about 4096×2160 pixels), or 8k (about 7680×4320)), instead certain conventional techniques are limited to generating output content limited to a resolution of 256 pixels.

To overcome one or more of the foregoing technical drawbacks of conventional techniques and systems, disclosed herein are systems and methods for performing face swapping in a more computer-resource and time efficient manner, while providing a more realistic and higher resolution output. It is understood that although reference may be made wherein to face swapping for illustrative purposes, the disclosed systems and methods may be used to swap other items instead of or in addition to human faces, such as hair, clothing/accessories (e.g., shirt, pants, shoes, dress, skirt, shorts, hat, headband, bathing suit, underclothing, glasses, purses, jewelry, scarves, gloves, etc.), limbs, digits, bodies, animal faces/bodies, non-humanoid or imaginary characters (e.g., animated characters or objects), and/or objects.

As similarly discussed above, conventional techniques for face swapping involve swapping the face of a real person from one image/video to replace the face of another real person in another image/video. By contrast, in order to reduce the needed computer and time resources, and to provide a higher resolution, more realistic output, certain techniques are disclosed that use a computer-generated image (rather than photographs or videos of a real face) to replace the face of a real person in a destination image/video in generating an output image/video. Although certain examples may refer to source, destination, and output videos, it is understood that certain techniques described herein may be also applied to single source, destination, and output images.

Referring to FIG. 1, an example architecture of an image processing system 100 is illustrated. The image processing system 100 may be used to generate an output video, wherein a face is swapped from a face region in a source video to a face region in a destination video. An image processing system may include memory (e.g., non-volatile memory, such as semiconductor EEPROM, magnetic memory, optical memory, etc.) that stores an animation application 106 and a face-swapping application 108. In addition, one or more operating systems, application programming interfaces, browsers, and/or other applications may be stored in memory.

A data store 110 may include relational databases, non-relational database (which may be advantageous as it may provide easier storage for large amounts of certain types of data, such face alignment data (e.g., JSON face alignment data)), and/or flat file systems that store digital content. For example, JSON face alignment data may be unstructured, flexible, and human-readable. The use of a non-structured database may enable the JSON face alignment data to be stored, without having to adapt the data to a specialized database language (e.g., SQL).

For example, the data store 110 may include training sets (e.g., 2D and/or 3D images/videos that include human faces) to pre-train the face-swapping application 108 (as discussed in greater detail elsewhere herein), source data sets (e.g., 2D and/or 3D images/videos that include animations of human faces generated using the animation application), destination data sets (e.g., 2D and/or 3D destination images/videos that include human faces), and output data sets (images/videos generated by the face-swapping application 108). One or more of the training sets described herein may be specifically created to train neural networks. For example, one or more cameras may be used to capture images of a plurality of facial expressions of one or more faces and transitions between facial expressions from a plurality of different angles. This approach ensures that a highly efficient set of images are available for training, without gaps or with a greatly reduced number of gaps (e.g., missing angles or expressions) and without having to process facial images that may be redundant in terms of their utility in training neural networks. For example, images from public sources, not specifically created for training neural networks, may be missing images of faces at certain angles or with certain expressions, or may include multiple images of a face at a given angle and with a given expression.

Optionally, in addition to or instead of storing purely animated source images (generated without the use of motion capture of a human), the data store 110 may store source animations images generated using a facial motion capture helmet and facial animation software. The facial motion capture helmet may be configured with one or more cameras. For example, the facial capture helmet may include several high-resolution, high-speed cameras on arms configured to capture facial expressions and nuances of the person wearing the helmet (where the cameras are positionable to capture different angles of the person's face) which may then be used as the basis for an animated face. The facial capture helmet may include on-board lighting configured to illuminate the face of the person wearing the helmet.

One or more cameras 114 may be used to capture still or video images which may be used as face swapping engine training images and/or as destination images. The cameras 114 may include spherical cameras (e.g., cameras that capture about a 360 field of view). The cameras 114 may be of a desired resolution (e.g., resolution sufficient to generate HD, 4K UHD, 4K, 8K, or 16K videos). One or more microphones 116 may be provided to record audio content (e.g., the speech of the person whose face is being recorded) in synchronization with the image/video content. For example, the audio content may be stored in the data store 110 as part of (a track of) a destination video. Optionally, two microphones may be provided to enable stereo recording.

The image processing (including the face swapping processes described herein) may be performed using one or more processing units, such as one or more graphics processing units (GPUs) 102-1 . . . 102-N and/or one or more Central Processing Units (CPUs), where one or more CPUs may optionally be utilized to supplement or replace the use one or more GPUs. A given GPU may include hundreds or thousands of core processors configured to process tasks and threads in parallel. A GPU may include high speed memory dedicated for graphics processing tasks. A GPU may be configured to render frames at high frame rates. A GPU may be configured to render 2-D and/or 3-D graphics, perform texture mapping, and render polygons at high speed.

A task allocator 104 may determine to which and to how many GPUs and/or CPUs to allocate graphics tasks from the animation application 106 and/or the face swapping application 108. The task allocator 104 may include or access one or more Central Processing Units (CPUs) that executes task allocation instructions, operating instructions, and/or other instructions. The task allocator 104 may designate which and to how many GPUs to allocate a given task based on one or more of the following criteria:
  a user instruction provided via a user interface specifying how many GPUs and/or CPUs are to be assigned to a task (e.g., a pre-training task, a training task, a swapping task, an animation task, etc.);
  the current utilization and availability of GPUs and/or CPUs;
  the individual configurations of the GPUs and/or CPUs (where the GPU farm is non-homogenous and certain GPUs have more processing power, functionality and/or memory then other GPUs).

A display 112 may be configured to display content from the data store 110, from the GPUs 102, from the animation application 106, from the face swapping application 108, user interfaces, other data, and/or the like. The display 112 may be any type of display, including an LCD, OLED, plasma, projector, virtual reality, or augmented reality displays. For example, the virtual reality or augmented reality display may be in the form of a headset/goggles that include a display for each eye.

The display 112 may be configured to render two dimensional or three dimensional images. The display 112 may include multiple displays which display the output of different applications, GPUs, and/or different content from the data store 110. Thus, for example, a first display may display source content, a second display may display destination content, and a third display may display output content generated by the face swapping application 108.

As noted above, the animation application 106 may be configured to generate animated faces (and optionally other computer generated imagery) to be used as source images/videos. For example, the animation application may be configured to generate computer generated imagery (CGI), such as a face, by performing the sculpture/modelling of a character face, texturing, lighting, and rigging. The animated object, a face in this example, can be a two-dimension (2D) model or a three-dimensional (3D) model in 3D space.

In particular, the animation application 106 may enable some or all of the following CGI features to be controlled by a user (e.g., an animator) and/or rendered:
  shading (e.g., how the brightness and/or color of a surface, such as a surface of a face, varies with lighting);
  texture-mapping (e.g., applying detail information to surfaces or objects using maps);
  bump-mapping (e.g., simulating small-scale bumpiness on surfaces);
  shadows (e.g., effects of obstructing light);
  reflection;
  transparency or opacity (e.g., the degree and areas of sharp transmissions of light through solid objects, such as a face);
  translucency (e.g., the degree and areas of scattered transmissions of light through solid objects, such as a face);
  indirect illumination (e.g., where an object surface, such as a face, is illuminated by light reflected off other surfaces, rather than directly from a light source);
  depth of field;
  motion blur;
  non-realistic rendering (e.g., making a face appear as a monster).

The animation application 106 may enable still additional features to be controlled by a user (e.g., panning, zooming in, zooming out, change focus, change aperture, and the like) and/or rendered.

The rigging may comprise an internal structure (optionally defined by the animator) as an interface. The rigging may include object components that deform the model of the face or other object. The animation application may provide an interface that enables a user to manipulate the rig to thereby control the deformations of the face or other object. Thus, the rig may be analogized to the functions of the strings of a marionette. The face (or other object) may be associated with properties such as elasticity and translucence.

Other techniques may be used to generate a CGI character or object that may be used as a source dataset. Optionally, pre-existing imagery (e.g., real persons or items identified in motion pictures, television shoes, animations, other video content, still photographs or graphics, and/or the like) may be utilized to generate a CGI model. Such techniques may provide a more accurate model while reducing the time and computer resources needed to create the CGI model.

For example, a single camera or a multi-camera array (e.g., an oscillating camera array) may be utilized to capture images of an object or person from a variety of angles with varying lighting (e.g., optionally while varying lighting intensity and/or lighting angle using one or more motorized lights or lighting arrays). A photogrammetry process may be performed to obtain measurements (e.g., positions of surface points) from the captured images and the measurements may be utilized to generate a CGI model (e.g., a 3D model of a talking head).

By way of further example, echolocation may be utilized to identify shapes and features of a target object or person using echoes of emitted sounds, which in turn may be utilized to generate a CGI model (e.g., a 3D model). By way of still further example, magnetic resonance imaging (MRI) or computed tomography (CT) may be utilized to form images of a target object or person, which in turn may be utilized to generate a CGI model. By way of yet further example, laser imaging, light detection and ranging (LIDAR), and/or infrared imaging may be utilized to scan and form images of a target object or person, which in turn may be utilized to generate a CGI model. Optionally, a CGI face can also be generated by other neural networks/models. By way of non-limiting example, a generative adversarial network (GAN) may be used in generating a CGI face. The GAN may include two neural networks, where a first neural network functions as a generative algorithm, while the second neural network (a discriminator) examines the generated faces of the first network to detect if the faces are real or not, thereby playing an adversarial function. The GAN may iteratively generate images based on photographs of real faces that the GAN learned from. The GAN may evaluate the new images generated by the GAN against the original faces.

Optionally, a neural network may be utilized to generate a CGI model. Optionally, a neural network may be utilized to transfer the style of a target object to a CGI model. By way of illustration one or more images may be generated according to combinations of features from source images (e.g., high level structures and contours of objects or persons) and features from style images (e.g., color and texture) at different levels of abstraction. Optionally, certain features, such as tattoos or makeup may be swapped from a body part of one real or animated person to a body part of another real or animated person.

Figure 2A:
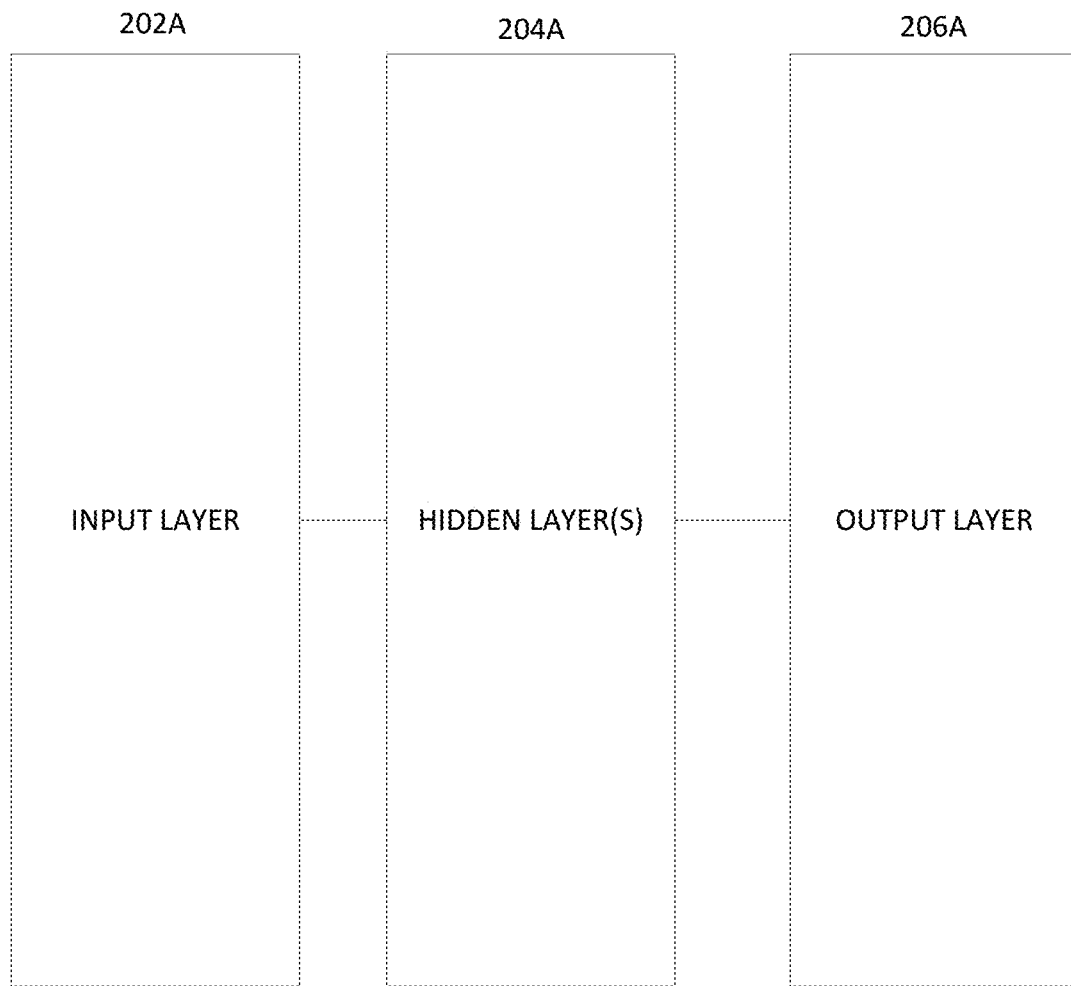
FIG. 2A-2B illustrates an example convolutional neural network architecture.

Artificial intelligence, such as a learning engine, may be used to identify objects, such as faces in image/video content, and/or to perform a face swapping (or the swapping of other objects) process. For example, the learning engine may include a convolutional neural network (CNN), such as a deep CNN, an example of which is illustrated in FIG. 2A. The CNN may include an input layer 202A, one or more hidden layers 204A, and an output layer 206A. The neural network may be configured as a feed forward network. The neural network may be configured with a shared-weights architecture and with translation invariance characteristics. The hidden layers may be configured as convolutional layers (comprising neurons/nodes), pooling layers, fully connected layers and/or normalization layers. The convolutional deep neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer. —Optionally, attention layers, configured to mask vectors, may be used as hidden layers (e.g., to mask image noise especially for scaled-up images). For example, an attention layer may enable the decoder to look-back at the encoder's hidden states based on its current state. This enables the decoder to extract only relevant information about the input tokens at each decoding, while excluding noise.

A specialized type of CNN, which may be referred to as an autoencoder, may optionally be configured to learn efficient data (image) codings in an unsupervised manner. As will be discussed in greater detail elsewhere herein, an autoencoder (AE) comprises neural networks (NN), with at least one hidden layer, that is trained to learn (or approximate) the identity function (where the NN output equals its input). Generally, the goal of the NN training (sometimes referred to as optimization) process is to minimize a loss (sometimes referred to as error, objective, or distance) function, computed on the output of the network, Y, and a target, T. Thus, during training, the goal is that Y should approach T, such that the loss decreases. This is also the case when training an AE, only the target is actually the input: T=X. In the literature, it is commonplace to refer to two separate parts of an AE, namely the encoder, and the decoder, where both the encoder and the decoder may comprise neural networks. The encoder maps (or encodes) an input, X, to some representation, C. Thus, C corresponds to an encoding of X. Conversely, the decoder maps (or decodes) the encoding, C, to a representation, Y---which is approximately (or exactly) the same as, X.

As will be described, an autoencoder may be utilized to perform the face swapping process. An autoencoder may attempt, with a reduced dimensionality, to replicate input vectors at the output layer with a reduced set of neurons/nodes.

Figure 2B:
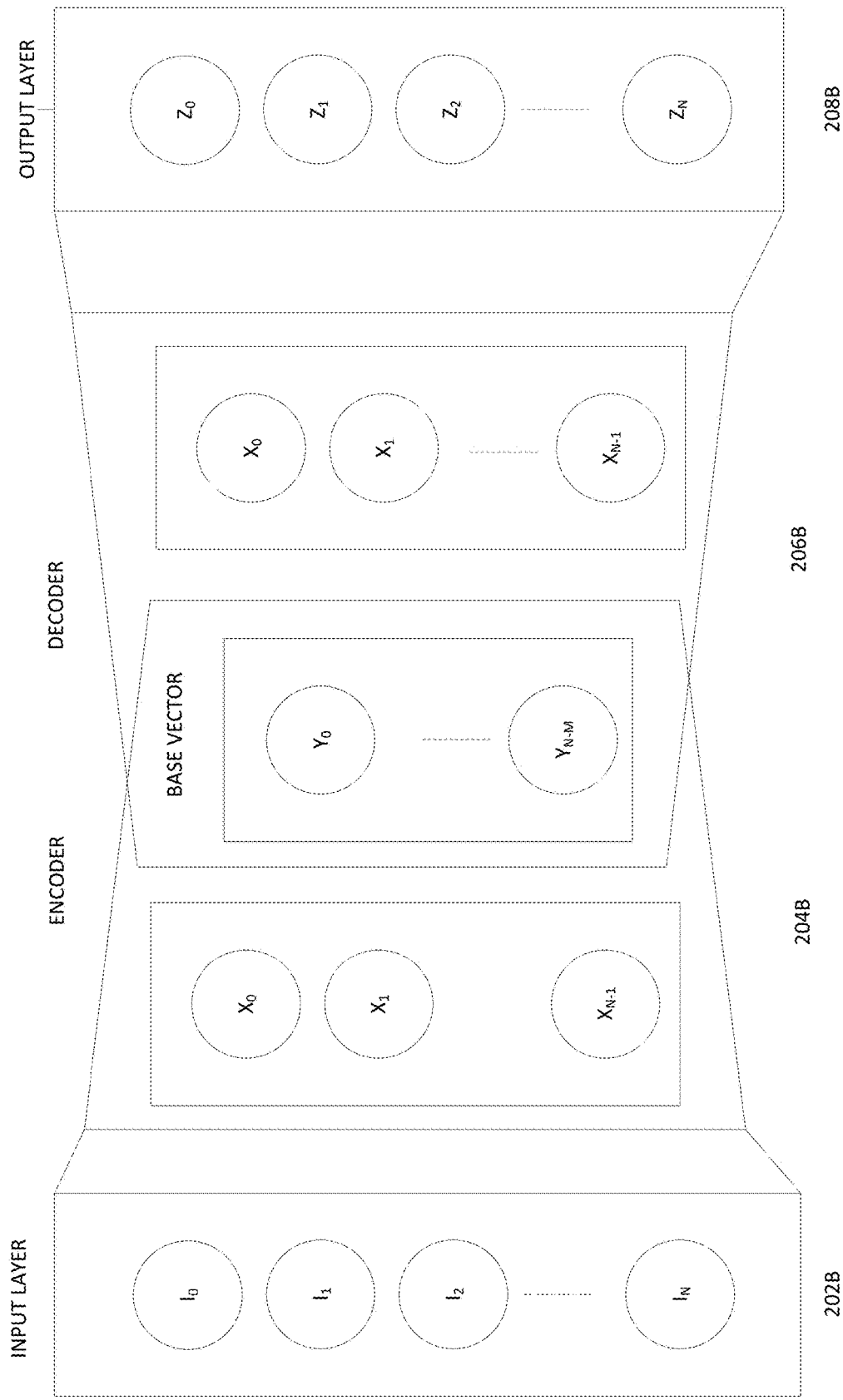

With reference to FIG. 2B, an example autoencoder includes an input layer 202B, an output layer 208B, an encoder 204B, and a decoder 206B. The encoder 204B in this example, maps the input (e.g., an image of a face) to generate a base vector (e.g., a latent image of the face). The decoder 206B maps the base vector (e.g., the latent image of the face) to a reconstruction of the original input (original image of the face). In this example, the output layer 208B has the same number of nodes/neurons as the input layer 202B to enable the input (an image of a face) to be reconstructed by the output, while minimizing the difference (the loss) between the output and the input.

In order to ensure that the autoencoder does not merely map the inputs directly to the outputs, the encoder 204B includes at least one hidden layer that optionally has fewer nodes/neurons than the input layer to thereby constrain the recreation of the input at the encoder output (in the base vector/latent image). Optionally, a hidden layer may have the same number of nodes or more nodes than the input layer. As illustrated, the encoder 204b and the decoder 206B share the base vector/latent image. For example, in certain instances it may not be necessary or desirable to have dimensionality-reduction. By way of non-limiting example, should the autoencoder be used to perform image de-noising, it may be desirable to add noise to the autoencoder input during training and try to reconstruct the noise-free input. In such an instance, a greater number of nodes may be used in one or more hidden layers than in the input layer (although in certain instances, a hidden layer may have fewer nodes than the input layer even in a de-noising application).

The encoder 204B and decoder 206B may include only a single hidden layer each or may include multiple hidden layers. Advantageously, the use of multiple hidden layers may result in improved compression. Further, advantageously, the use of multiple hidden layers may greatly reduce the computational resources needed to generate a base vector/latent image by the decoder 206, and to generate an output by the decoder 206B, and may reduce the amount of training data sets needed for training. —Optionally, to increase the output resolution and fidelity, the number of nodes in a given layer (the layer width) may be dynamically increased to process the increase variables. However, increases in the layer widths may also increase the amount of memory needed to hold the corresponding vectors and data. Therefore, if relatively lower resolution is needed, the hidden layer width may be reduced, to thereby reduce the amount of memory and other resources needed. Optionally, such dynamic adjustment of layer widths may be performed using hardware-based neural network. Thus, the layer width and/or the number of layers may optionally be adjusted so that excess memory and processing resources are not utilized for a given desired resolution, and so that the desired resolution and fidelity are achieved.

A given node edge may be assigned a respective set of weights. Backpropagation may be used to adjust the weights each time the error is calculated to improve the autoencoder performance. Thus, training the autoencoder enables the encoder to represent the input (e.g., the image of a face or other base vector) in a more compact form (a lower dimensional representation of the face), which the decoder than attempts to reconstruct.

As will be described, the encoder 204B and decoder 206B may be trained using destination images with original faces. The encoder 204B (and optionally a different decoder) may also be trained using source faces. After training is performed, a latent face generated by the encoder 204B of the destination/original face may be feed to the decoder that was trained using the source face. The decoder trained using the source face will attempt to reconstruct the destination face, from the information relative to source face, resulting in a face that has the expressions and orientations of the destination face but having the source face.

Optionally, one or more intermediate networks may be utilized within the autoencoder to help learn more abstract representations. A first example intermediate network may include one layer or multiple fully connected layers. The layers may include convolutional layers, pixel upscaling layers, and/or one or more activation functions. The intermediate network may be functionally positioned between the encoder and decoder.

A second example intermediate network may be used to classification and manipulation of the latent image output from the encoder. The second example intermediate network may include one layer or multiple fully connected layers, and the layers may include convolutional layers, pixel upscaling layers, and/or one or more activation functions This second example intermediate network may be functionally positioned between the encoder and decoder. Such an intermediate network enables mapping and fine-tuning of generated features by determining which parts of the latent image relate to which features and then directly manipulating the latent image (e.g., shifting in x direction by x amount) before the latent image is fed to the decoder.

Figure 3A:
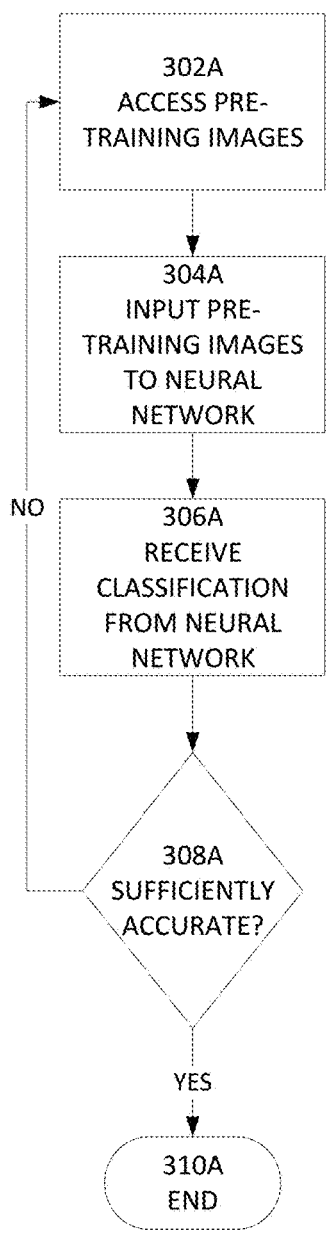
FIGS. 3A, 3B, 3C illustrate example autoencoder and one-shot (few shot) architectures.
Figure 3B:
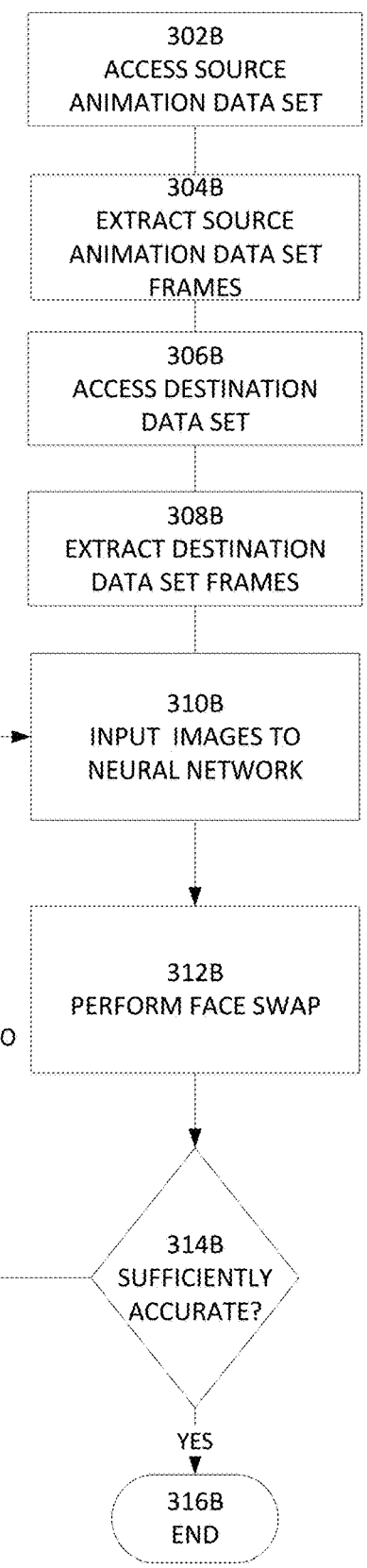

FIGS. 3A-3B illustrate an example learning engine (e.g., CNN autoencoder) pre-training process (3A) and an example learning engine (e.g., CNN autoencoder) training process (3B). The pre-training process optionally uses large numbers of images of different faces (e.g., 3,000-10,000 facial images). The pre-training images may be from one or multiple sources. The pre-training process may be utilized to train the learning engine to identify and classify faces in images and/or facial features (e.g., nose, eyes, mouth, etc.). The training process may be utilized to train the learning engine to replicate input vectors at the output layer with a reduced set of neurons/nodes, to thereby train the learning engine to perform face swapping.

At block 302A, pre-training images are accessed from one or more data sources. The data sources may be maintained and hosted by the same entity that maintains and operates the learning engine and/or may be maintained and hosted by other entities. At block 304A, one or more images are provided to the learning engine for pre-training. At block 306A, the learning engine attempts to identify/classify faces and/or features thereof, and the classification outputs are received. For example, the learning engine may be configured to generate a bounding box around what the learning engine has classified as a face. At block 308, the learning engine's classification may be examined (e.g., by a human or another face classification system) and a determination is made as to whether the classification is correct. At block 308A, a statistical analysis may be performed as to the overall classification accuracy of the learning engine for multiple classifications performed on respective images. For example, the average accuracy may be utilized:

Average accuracy=total correct classifications/total classifications

The determined accuracy may be compared to a minimum threshold accuracy. If the determined accuracy is equal to or exceeds the threshold accuracy, the process may end at block 310A. Otherwise, additional pre-training figures may be accessed and additional pre-training performed until the determined accuracy satisfies the accuracy threshold and/or until a certain amount of time has elapsed.

Referring now to FIG. 3B, at block 302B the example training process accesses the source animation data set for a given character. For example, the source animation data set may include animated images (a video) of different expressions (e.g., with different positions and/or movement of the mouth, lips, tongue, facial muscles, eyelids, eyebrows, nostrils, cheeks, forehead, wrinkles, teeth and/or the like), angles, and/or lighting of the face of the CGI character generated using the animation application 106. For example, nostrils may be flared to indicate arousal, lips may be positioned as a grin to indicate happiness, lips may be compressed to indicate anger or frustration, lips may be shaped into a pout to indicate sadness of uncertainty, lips may be pursed to indicate disagreement, a tongue may protrude from lids to indicate focus or disagreement, eyes may be widened to indicate excitement, big pupils may be used indicate arousal or interest, etc.

By way of illustration, the different expressions may include some or all of the following:
Anger (e.g., flared nostrils, eyebrows squeezed together to form a crease, eyelids tight and straight, slightly lowered head, eyes looking upwards through a lowered brow, tightening of facial muscles, tight lips);
Boredom (e.g., half-open eyelids, raised eyebrows, frowning lips, relaxed muscles, vacant gaze, immobile face);
Concentration (e.g., erect or pushed forward head, fixed eyes, reduced blinking, unconscious movement of tongue, slightly raised eyebrows);
Confusion (e.g., forehead and/or nose scrunched up, one eyebrow raised higher than the other, pursed lips);
Contempt (e.g., neutral eyes with one side of the lip turned up and pulled back);
Disgust (e.g., raised upper eyelid and lower lip, wrinkled nose, raised cheeks, flared nostrils, closed mouth);
Excitement (e.g., open-mouthed smile, wide eyes, raised eyebrows);
Fear (e.g., eyebrows raised and drawn together, wrinkled forehead, raised upper eyelid, tensed lower eyelid, whites of the eyes are visible, gaping mouth, tensed lips);
Frustration (e.g., inward slanting eyebrows that are squeezed together, raised chin, lips pressed together, frowning, mouth twisted to one side with a crease on the cheek);
Glare (e.g., tensed eyebrows, squinted eyes, intense gaze.);
Happy (e.g., smiling, teeth exposed or not exposed, raised cheeks, crow's feet or wrinkles near corners of the eyes, crescent shape of eyes);
Revolted (e.g., lips pulled back in a frown, chin lowered, tensed lips, eyebrows tensed and drawn together, wrinkled forehead, head pulled back);
Sad (e.g., inner corners of the eyebrows are drawn in and upwards, frowning of lips, jaw protrusion, pouting of lower lip, eyes cast down);
Seduction (e.g., fixed and intense eyes, biting lips, tilted head, slight smile, one eyebrow raised higher than the other);
Snarl (e.g., tensed eyebrows, squinted eyes, intense gaze, exposed teeth, and lips pulled back);
Surprise (e.g., widened eyes, gaping mouth, raised eyebrows, lowered chin, head held back).

Other example facial expressions may include aggression, arousal, contentment, contemplation, doubt, elation, exasperation, impatience, pleasure, suspicion, terror, wariness, etc.

In addition to capturing expressions of the animated face, transitions between expressions may be captured (e.g., from surprise to happiness to contentment, and so on). Such expression transitions may greatly contribute to the ability to perform high quality, accurate, face swapping. Optionally, several versions of each expression may be captured (e.g., captured from different angles and/or with illumination from different angles and/or with different intensities).

Figure 8:
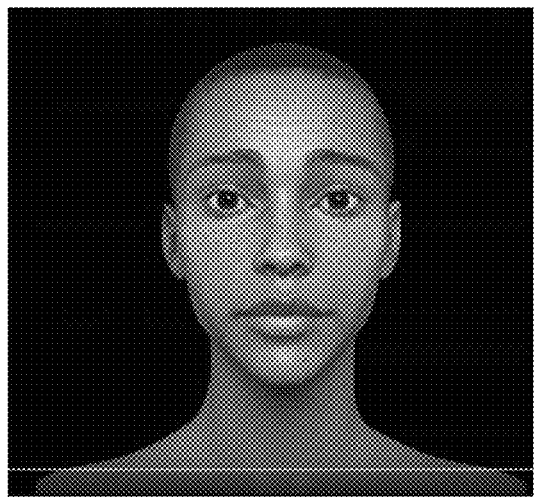
FIG. 8 illustrates an example CGI face presenting different expressions.
Figure 8:
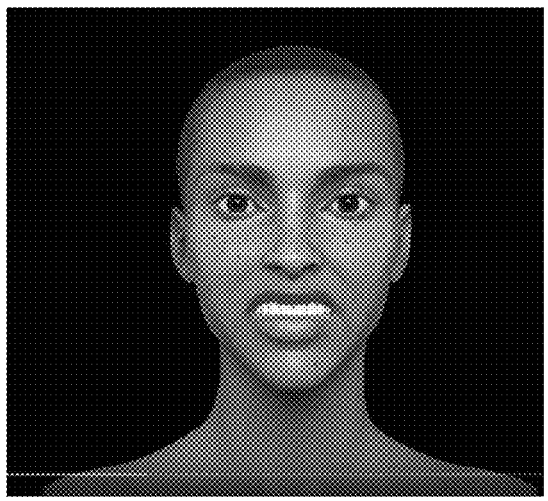
Figure 8:
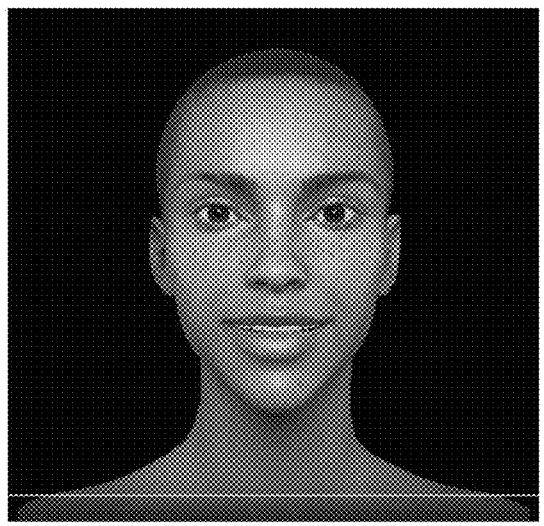
Figure 8:
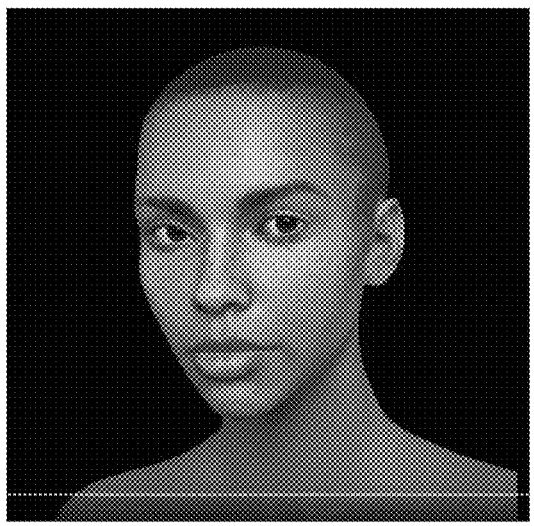
Figure 8:
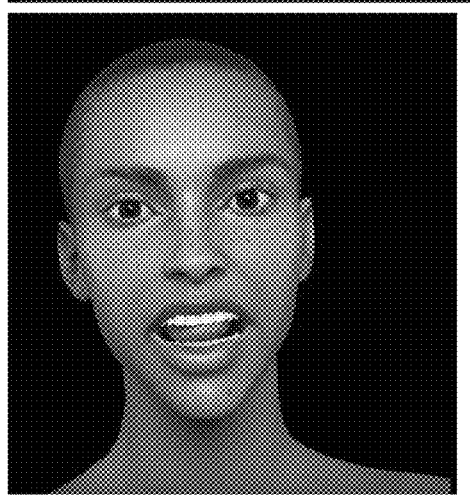
Figure 8:
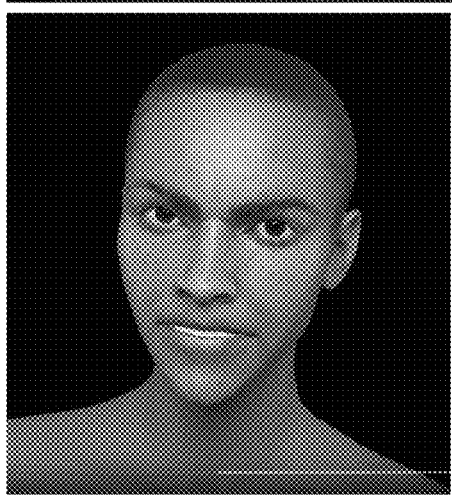

FIG. 8 illustrates example expressions on a CGI generated face.

At block 304B, frames are extracted from the source data set video. The faces in the source frames may be located and aligned (e.g., to remove any rotation relative to the frame base) to facilitate the face swapping operation. Optionally, other preprocessing may be performed. For example automatic time 'tagging' may be performed based on which faces are detected in the frames of the video, wherein timing data associated with when in the video a given face was identified may be stored in association with a face identifier.

For example, a tool/module may be provided which accesses a video, optionally renders a visual timeline (optionally in conjunction with a navigation scrubber) of the video overlaying or adjacent to a video player playback area, detects positions (and associated timing) where each unique real or CGI person's face (or other specified feature) is present, and then automatically adds text, image, and/or graphic tags (e.g., timestamps) to the video timeline indicating at which points a desired target face appears. The module may enable the video to be automatically cropped in accordance with such assigned tags, to thereby remove unneeded video content (e.g., footage that does not include a specified face) before further preprocessing is performed, thereby reducing processor and memory utilization.

Other example processing tools may be utilized to perform super-resolution and upscaling of dataset images, sorting tools to aid in the identification and removal of blurry or unwanted images, and the like. For example, a super resolution process may perform upscaling and/or improving details within an image. For example, a relatively low resolution input may be upscaled to a higher resolution, and the higher resolution image may have portions filled in where the details are essentially unknown. Such a super-resolution process may optionally be performed using a learning engine, such as a Generative Adversarial Network (GAN).

Blurry facial images may be detected using one or more techniques. For example, a Fast Fourier Transform (FFT) of an image may be generated and the distribution of low and high frequencies may be analyzed to detect whether the amount of high frequencies components are less than a certain threshold. If the amount of high frequencies components are less than the threshold, the image may be classified as blurry and removed from the image dataset to thereby reduce processor and memory utilization and improving the neural networks performance.

At block 306B, the destination data set is accessed. The destination data set may comprise a video including a real, non-CGI character whose face is to be replaced with the CGI face from the source data set. By way of example, the non-CGI character may be engaged in acting a part in a movie, video game, video podcast, music video, or the like. Optionally, the non-CGI character may be speaking or singing in the recording. Advantageously, the destination video may be captured at high resolution and at a high frame rate (e.g., 60-120 frames per second (fps) to provide smoother action), although lower frame rates (e.g., 24 or 30 fps) may be used. At block 308B, frames are extracted from the destination data set video. The faces in the destination frames may be located and aligned (e.g., to remove any rotation relative to the frame base) to facilitate the face swapping operation.

At block 310B, at least a portion of the extracted source and destination frames (with the faces aligned) are provided to the learning engine (e.g., a CNN autoencoder). Optionally the same encoder may be trained using both the extracted source frames and the extracted destination frames, but a first decoder may be trained using the latent images generated by the encoder from extracted destination frames, and a second decoder may be trained using the latent images generated by the encoder from extracted source frames. At block 312B, the autoencoder comprising the encoder and the first decoder is used to swap the CGI animated face from the source data set with the face in the destination data set.

At block 314B, a determination is made as to whether the swapping operation is sufficiently accurate and consistent. For example, the consistency of the face swapping operation may be evaluated by measuring the squared Euclidean distance of two feature vectors for an input and a face-swapped result. The determination as to whether the swapping operation is sufficiently accurate may be made by determining whether the squared Euclidean distance of two feature vectors is less than a first threshold. If the determination indicates that the face swapping is sufficiently accurate (or if the training tie has exceeded a time threshold), at block 316B the training may be halted. If the determination indicates that the face swapping is not sufficiently accurate, additional source and/or destinations facial images may be provided to the autoencoder at block 310B and the training may continue. A user interface may be provided that enables the user to name and/or associate tags with the trained autoencoder (sometimes referred to as a model). Such naming and tagging abilities facility later identification and searching for a desired model.

Figure 3C:
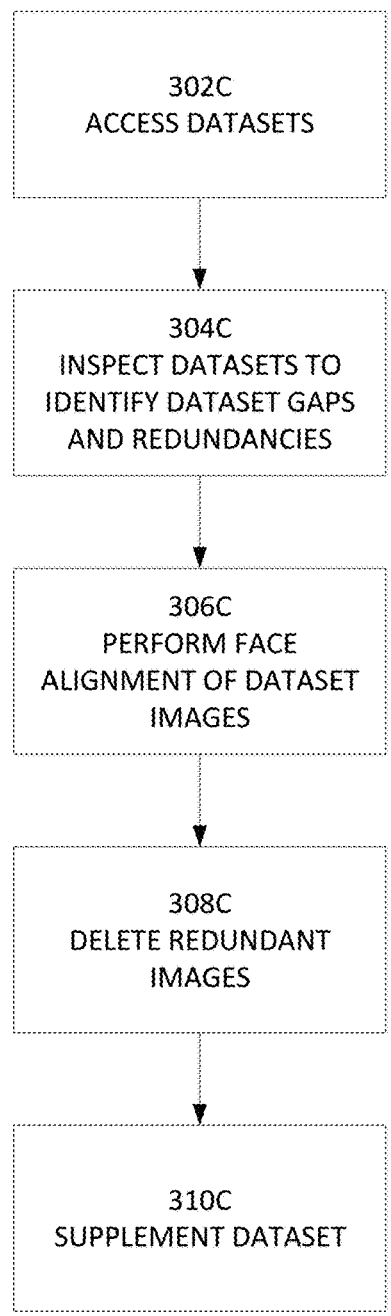

Referring now to FIG. 3C, optionally, to reduce the number of images needed to perform training or pre-training (and the resources and time needed to perform such training), the system may use an automated tool and process configured to access, scan, and analyze source and destination datasets to construct highly efficient source dataset of a relatively reduced size. The process may analyze the destination dataset images to locate and identify specific pieces of source data that are needed in order to have an optimal/full destination dataset.

At block 302C, the source dataset and the destination dataset may be accessed from memory. For example, the process may access a large repository of labeled source data which includes images of a subject from a large number angle, lighting conditions, eye gaze angles, positions, mouth shapes, eyelid positions, eyebrow positions, etc.

At block 304C, the images (e.g., facial images) in the destination dataset and the source dataset may be aligned thereby enabling the process to better analyze the differences between the images in destination dataset and the source dataset. For example, the alignment may include alignment of some or all of the following aspects and features: face position, nose position, position of eyes, position of mouth, eye gaze angle, and position/shape of the mouth (e.g., open, closed, talking, smiling, tongue presence/position, etc.). By way of illustration, the process may identify the geometric structure of the faces in the images (e.g., identifying facial landmarks, such as jawline, face edges, etc.) and perform a canonical face alignment based on normalization, translation, scale, and/or rotation. Optionally, a transform may be applied to a facial image such that the landmarks on the input face match the landmarks of a second facial image or a supervised learned model. Optionally, the lighting may be analyzed in respective images to determine if there are lighting gaps that need to be supplemented.

Optionally, the alignment may be performed using one or more neural networks (e.g., deep convolutional neural networks, a Face Alignment Recurrent Network (FARN), or the like).

At block 306C, the process inspects the alignments of the faces in the source dataset to identify gaps in the source dataset relative to the destination dataset. For example, the process may identify images in the destination dataset that include certain facial angles, positions, frames for which there are not corresponding images in the source dataset. The process may also identify in the source dataset unneeded or unnecessary frames/data based on the scanned destination dataset (e.g., because there are no images of corresponding facial angles in the destination data set).

For example, after alignment is performed on images in the datasets, the alignment differences between a face image in a source dataset may be compared to corresponding face images in the destination dataset, and the mean square alignment differences may be calculated. If the mean square alignment differences are larger than a specified first threshold (indicating the alignment difference is too large), then a supplemental face image may be needed to fill the gap.

In addition or instead, the process may identify unneeded images/data in the source dataset (e.g., where the alignment differences are less than a specified second threshold)

At block 308C, images that are considered to be unneeded or unnecessary in the source dataset may be deleted (e.g., where the alignment differences are less than a specified second threshold), thereby reducing memory utilization needed to store such images and reducing processing resources that would otherwise be needed to process or analyze such images in the future.

At block 310C, facial images may be accessed or generated to fill the identified gaps in the source dataset.

Optionally, an algorithm may be used that enables the optimization of model hyperparameters/options which may be utilized to intelligently select optimized (e.g., best) values (e.g., given the performance and availability of GPUs and/or CPUs) for autoencoder training. The hyperparameters may include variables which determines the neural network structure and which may be set before training (e.g., before optimizing the node weights). Hyperparameters may include one or more of network weight initialization, number of hidden layers, activation function, momentum, dropout, learning rate (which represents how important is a weight change after a re-calibration), batch size, and/or the like.

The algorithm may use data obtained from multiple combinations of a given hyperparameter. Such data may include the amount of the change and its impact on memory utilization, optionally in combination with the other hyperparameters. A search function may be utilized that, based on constraints including a determined amount of available memory (e.g., dual ported Video RAM (VRAM)) and a specified desired resolution, returns an optimized (e.g., the best possible) combination of hyperparameters within the constraints. The impact of each hyperparameter may be determined in correlation to each other hyperparameter.

Thus, the foregoing process enables highly efficient, targeted training due to only the necessary data being present in the source dataset.

Conventionally, in order to create a talking head model using a neural network, it is desirable or needed to use a large dataset of images of a person. In certain scenarios, it may be desirable to generate a talking head model from only a few image views (or a single image) of a person.

Optionally, a single source image transfer process may be utilized in conjunction with or instead of the multi-image pre-training process. For example, meta-learning by a generative adversarial network may be performed on a large dataset of images (e.g., images obtained from videos or still images). Then, the generative adversarial network may be capable of few-shot or one-shot learning of neural talking head models of previously unseen people (e.g., as adversarial training problems with generators and discriminators). As described herein in greater detail, the generative adversarial network may include a generator that has a goal producing outputs that a discriminator is unable to distinguish from a given class of training data.

Multiple neural networks (e.g., including a generative adversarial network) may be utilized in a learned model, where each neural network is configured to perform a specialized part of the process. Advantageously, this architecture does not have to be retrained for each target video/face/person. Rather, the neural networks are pre-trained on a wide and deep dataset in order to learn how to generalize faces. Once the model pre-training is performed, the model may be used for "one-shot" reenactment and segmentation of a CGI face to a target image or images (e.g., a target video). For example, using a one-shot architecture may need only a single source face image and 1 to 5 destination face images in order to generate a reconstructed destination image face that has the likeness of the source face, while maintain the expression of the destination face. Thus, the one-shot architecture (implemented using a generative adversarial network) may be particular advantages where there is a paucity of source and/or destination images.

As similarly discussed above, a given neural network may be configured with an encoder and decoder, and may include an input layer, one or more hidden layers, and an output layer. A given neural network may be configured as a feed forward network. A given neural network may be configured with a shared-weights architecture and with translation invariance characteristics. The hidden layers may be configured as convolutional layers (comprising neurons/nodes), pooling layers, fully connected layers and/or normalization layers. The convolutional deep neural network may be configured with pooling layers that combine outputs of neuron clusters at one layer into a single neuron in the next layer. Max pooling and/or average pooling may be utilized.

The networks in a one-shot architecture may include an adversarial-style generator and discriminator/classifier. For example, a first neural network, which may be referred to as the generator, generates new data instances (e.g., synthesized faces in this example), while a second neural network, which may be referred to as the discriminator, evaluates the generated data instances for authenticity (where the discriminator decides whether each reviewed instance of data (a face) that it reviews belongs to the actual training dataset (e.g., of faces) or not. The discriminator takes in both real images and fake images generated by the generator and returns probabilities indicating the likelihood that the image is real or a generated face image. The generator will continuously improve its generation of faces to "fool" the discriminator. The one-shot architecture (using the generator) may generate output images (still images, video images) in high resolution (e.g., HD, 4K UHD, 4K, 8K, or 16K).

Figure 10:
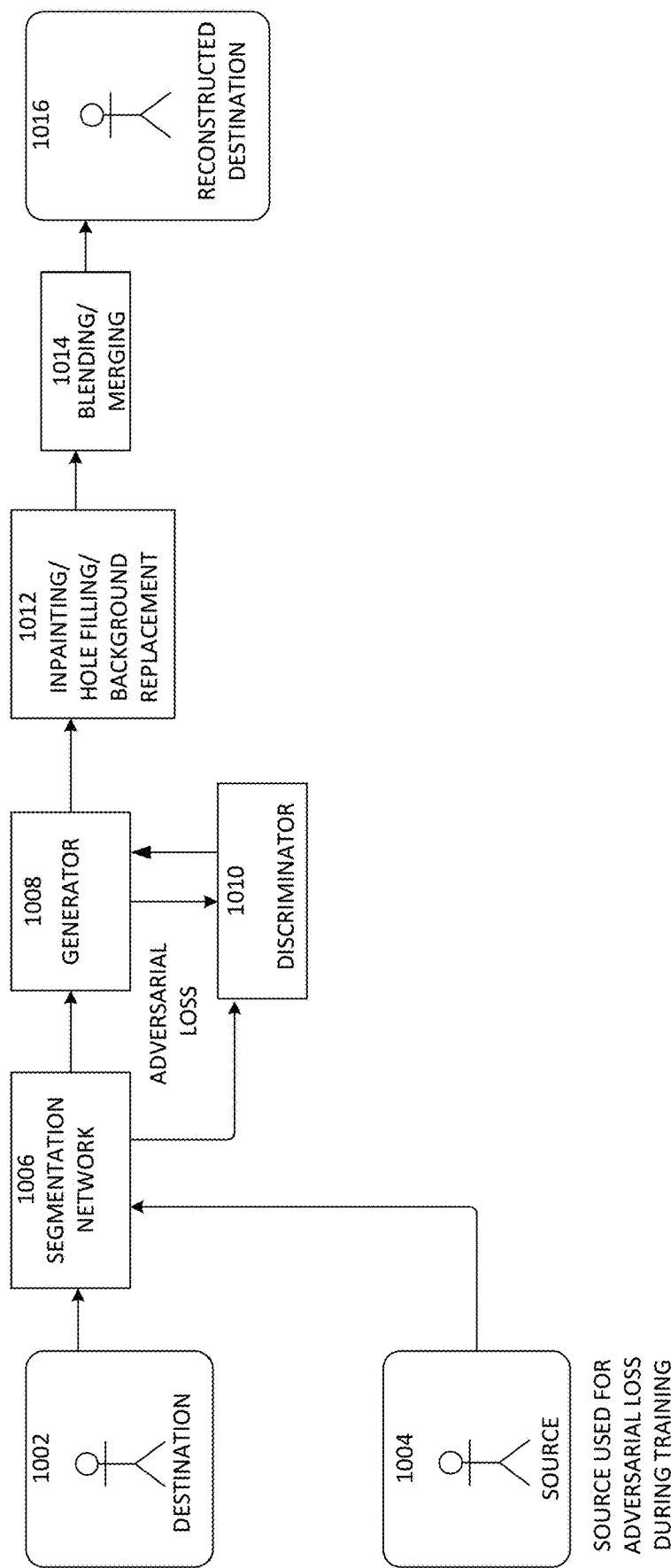
FIG. 10 illustrates an example multi-network configured to perform face swapping using relatively few images.

Referring to FIG. 10, an example one-shot (few shot (e.g., 1-100 images)) architecture is illustrated. A generator 1008 is initially trained using a source dataset 1004 of source images (that include faces). The source dataset 1004 is provided to a segmentation network 1006. The segmentation network 1006 may comprise a convolutional neural network (e.g., a Fully Convolutional Network (FCNs)) trained to recognize a body part, such as a face (e.g., excluding the neck, ears, hair, long beards, and objects that might obscure the face). The segmentation network 1006 may mask, highlight, label, or otherwise identify the body part.

The generator 1008 is configured to synthesize a real looking face (e.g., starting with random noise as an input). The discriminator 1010 is configured to attempt to identify whether the synthesized face is a real face or a synthesized face. The discriminator 1010 may comprise a neural network that performs classification, where the discriminator 1010 outputs the probability (e.g., in a range of 0 to 1) that image of a face is real. For example, during the training process, the discriminator 1010 may be provided real images of faces from the training source dataset 1004 a portion of the time (e.g., half the time) and fake, synthesized images of faces from the generator 1008 another portion of the time (e.g., half of the time), and attempt to accurately classify the faces as real or synthesized faces. A model error may be generated (minimax loss, Wasserstein loss, etc.) and backpropagated to adjust the generator 1008 neural network weights to improve the performance of the generator 1008 in generating a realistic face.

Other loss functions (which may be used for the one shot/few shot architecture or for the architecture illustrated in FIGS. 2A-2B) may include per-pixel loss. For example, the per-pixel loss function may be utilized (comprising summing the absolute errors between pixels), with respect to the architecture illustrated in FIGS. 2A-2B, toward the end of training to fine-tune certain more specific features. By way of further example, perceptual losses may be utilized (comprising summing the squared errors between pixels and taking the mean), which may provide much faster results (where the perceptual loss function is optimized using high level features extracted from already trained neural networks) and/or more accurate results. By way of example, a perceptual loss function may be utilized to compare high level differences between images, such as content and style discrepancies. By way of yet further example, triple-consistency loss function may be utilized. The triple-consistency loss function may reduce the distance between the outputs generated by the neural network for different routes to the target, independent of intermediate steps, and so may reduce gaps between input and target domain distributions.

If the generator 1008 is successfully trained, then the generator 1008 will generate highly realistic face (ideally, indistinguishable from real faces). The generator 1008 may then be fed destination images 1002 that include a face, and will swap a face likeness (e.g., optionally excluding the neck, ears, hair, long beards, and objects that might obscure the source face) from a source dataset (which may be a CGI face or a real face) for the destination image face to thereby generate a reconstructed destination image with the source face.

However, it is possible or likely that the face generated by the trained generator 1008 will not be perfectly integrated with the rest of the destination head (e.g., neck, ears, hair, long beards, etc.). For example, there may be holes, missing pixels, and/or blurriness in the reconstructed destination image. Hence, an image correction neural network 1012 may be utilized to perform inpainting, hole filing, and/or background replacement (e.g., to add background features from the original destination image that are missing from the generator outputted reconstructed image) on the reconstructed image provided by the generator 1008. For example, the image correction neural network 1012 may reconstruct missing parts of an image so that a view of the image is unable to tell that that regions of the image have undergone restoration.

The image correction neural network 1012 may be trained. For example, images corrected by the correction neural network 1012 may be analyzed, and a loss function (e.g., a cross-entropy error function, a mean squared error function, etc.) may be used to generate a model error value based on differences between pixel values of the image output by the generator 1008 (which may indicate missing pixels or blurriness) and the corresponding training image. The correction neural network weights may then be updated using the backpropagation. The result provides a much more realistic and accurate reconstructed image, with the destination head and expressions, and the source face.

If needed or desirable, a blending/merging component 1014 (which may comprise a neural network) may be utilized to perform further blending/merging operations on the output image generated by the correction neural network 1012.

Figure 4:
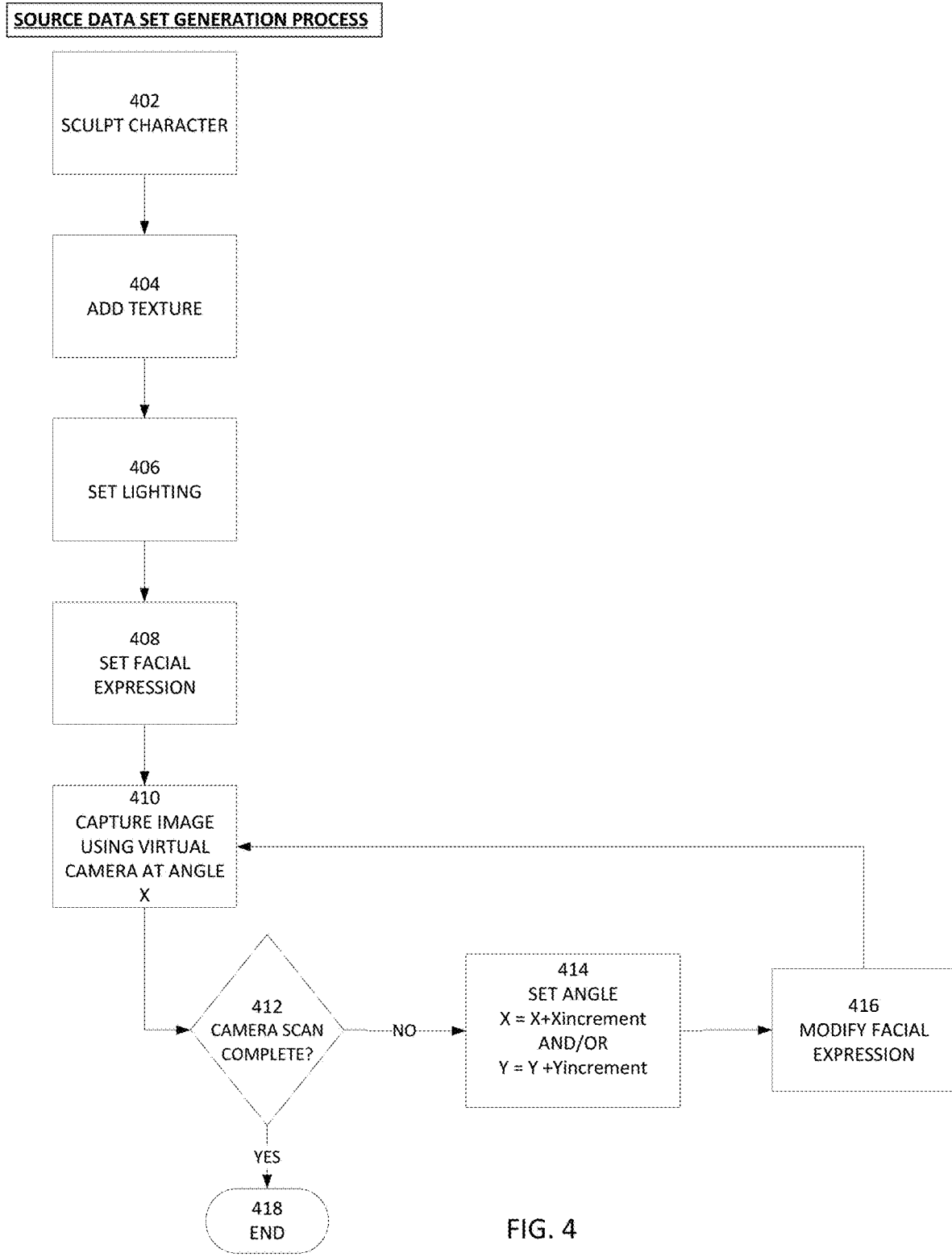
FIG. 4 illustrates an example process for generating a source data set.

FIG. 4 illustrates an example process for generating a source data set (e.g., an animated CGI face). A block 402, the character face is sculpted (e.g., using an animation application) by an animator to create a 3D model. Optionally, the character face may be configured to be rendered on volumetric basis (where a 3D model/data set is projected to 2D, approximating the integration of light rays cast into the volume). At block 404, texture may be added to the sculpted face. For example, bumps, wrinkles, a subdermal layer, a specular highlight map, translucency, and/or the like may be added to create a realistic skin.

At block 406, illumination may be specified. For example, direct illumination and/or indirect/global illumination may be specified. By way of further example, sunlight, fluorescent light, incandescent light, overcast, darkness may be specified. Optionally, the resultant source data set may be tagged with the specified illumination factors. At block 408, a facial expression or transition between facial expressions may be specified. Example facial expressions are described elsewhere herein (anger, aggression, boredom, concentration, contentment, confusion, contemplation, contempt, disgust, doubt, elation, exasperation, excitement, fear, frustration, glare, happy, impatience, pleasure, terror, wariness, sad, seduction, snarl, surprise, suspicion, terror, wariness, etc.).

At block 410, one or more virtual cameras are used to capture an image of the animated face with the specified expression at a first angle. A virtual camera may be in the form of software that works and may behave in a similar manner to an optical camera or digital camera would in the physical world. The virtual camera software, when executed, performs calculations to determine how the CGI object will be rendered based on the location and angle of the virtual camera. The virtual camera may be configured to perform such virtual camera functions as panning, zooming in, zooming out, change focus, change aperture, and the like. Optionally, the texture may be added after the virtual camera captures the image of the CGI face rather than before the virtual camera captures the image of the CGI face. In addition, a virtual light detector (e.g., a virtual integrating sphere) may be used to measure the direction and angle of light reaching the virtual camera.

At block 412, a determination is made as to whether the image capture scan of the animated face is complete. For example, the scan may have been set up to scan+/−60 degrees vertically and +/−90 horizontally relative to the center of the CGI face.

If the scan has been determined to be completed, the scan process is completed at block 418. Optionally, the scan process may be repeated with a different level, angle, and/or type of illumination.

If the scan has not been completed, the process proceeds to block 414. At block 414, (assuming the scan began a the maximum negative angle), the horizontal angle X is incremented by X increment degrees (e.g., 0.1, 0.5, 1, or 2 degrees) and/or the vertical angle Y is incremented by Y increment degrees(e.g., 0.1, 0.5, 1, or 2 degrees). Optionally, rather than changing the camera angle, the camera's position may be held constant and the face may be accordingly rotated in view of the virtual camera.

At block 416, the facial expression may be changed (e.g., to a next facial expression in a list of character facial expressions), and the process may proceed to block 410. The virtual camera may capture an image of the CGI face with the new expression. The resultant source data set may be tagged and/or named to indicate the illumination used. The animator may be provided with a user interface via which the source data set may be specified as well as one or more tags. The source data set may then later be located using a search engine, where the search engine will search for and locate source data sets whose name, tags, creation dates, and/or last edit dates match user-specified search criteria provided via a search user interface. The search results may then be presented to the user via one or more displays.

Optionally, once the source data set is completed, the resulting source video of the facial expressions (and transitions between the facial expressions) may be viewed. The display may be a virtual reality or augmented reality headset that enables the viewer to pause the source video and walk or navigate around the CGI face to view the face from any angle. The source video may be generated in high resolution (e.g., HD, 4K UHD, 4K, 8K, or 16K).

As noted above, one or more virtual cameras may be used to capture images of the CGI face. A tradeoff may be made as to how fast the image capture process is to be performed versus how much data needs to be processed. For example, 36 virtual cameras may be used, 6 virtual cameras may be used, or 1 virtual camera may be used, where the fewer the number of virtual cameras, the less processing resources needed.

Figure 5:
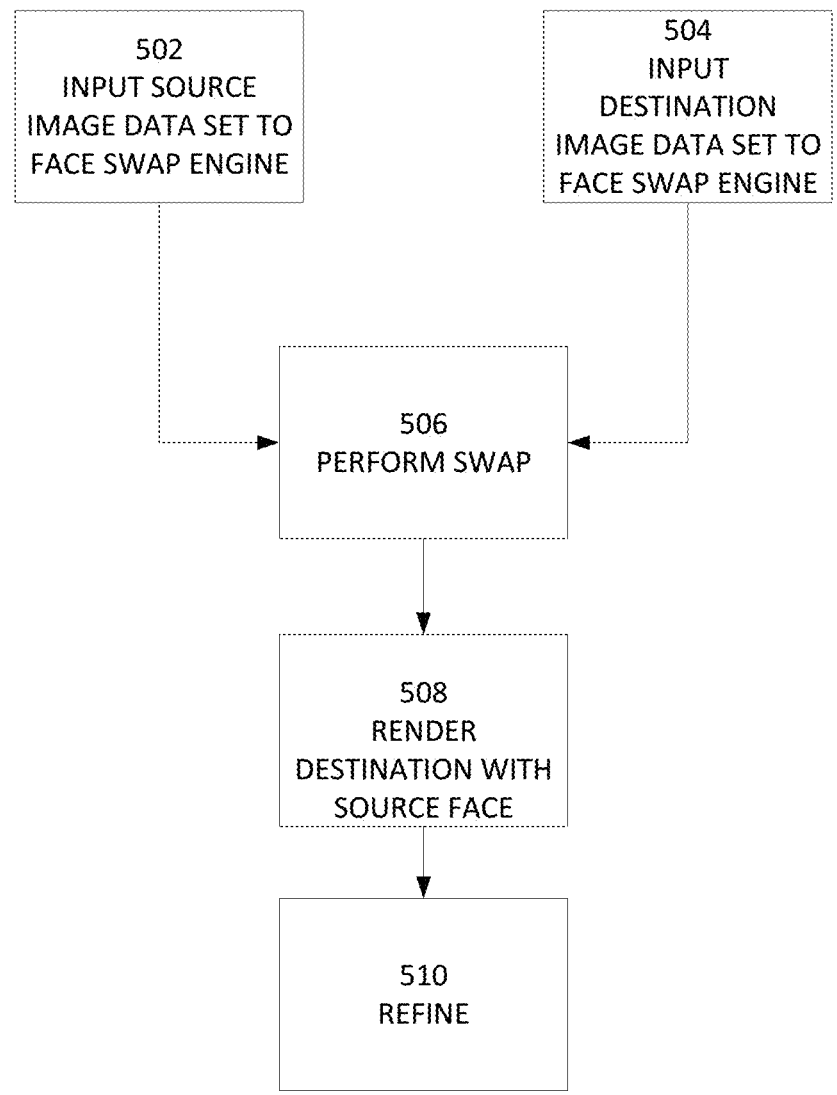
FIG. 5 illustrates an example face swapping process.

FIG. 5 illustrates an example face swapping process. At block 502, the source data set of CGI facial images is provided to the trained artificial intelligence engine (e.g., the trained autoencoder (e.g., a generative adversarial network)). At block 504, the destination data set of CGI facial images (e.g., generated using one or more of the techniques described herein) is provided to the trained artificial intelligence engine. At block 506, the trained artificial intelligence engine performs the face swap (e.g., by feeding the destination data set facial images to the encoder trained using source and destination facial images and to the decoder trained using the source facial images), where the output has the CGI source face while preserving the expressions of the face in the destination images.

At block 508, the output video sequence images are rendered on a display (the destination image with the destination face replace with the CGI facial image). If the destination images were associated with a speech track recorded of the person in the source images speaking, the output may have the lips and facial expressions of the CGI face synchronized with the speech track so that it appears that the CGI face is speaking the recorded speech track in the same manner as the original face. Advantageously, the source data set and/or the destination data set may be high resolution and the output may be rendered in high resolution (e.g., HD, 4K UHD, 4K, 8K, or 16K).

At block 510, an animator may manually refine the face-swapped image(s). For example, the face-swapping may results in a certain amount of blurriness as a result of pixel loss, particularly with respect to certain features, such as teeth. Image processing tools may be provided to sharpen the image or selected portions thereof. Further, image processing tools may be provided to remove or reduce undesirable shadowing.

Figure 9:
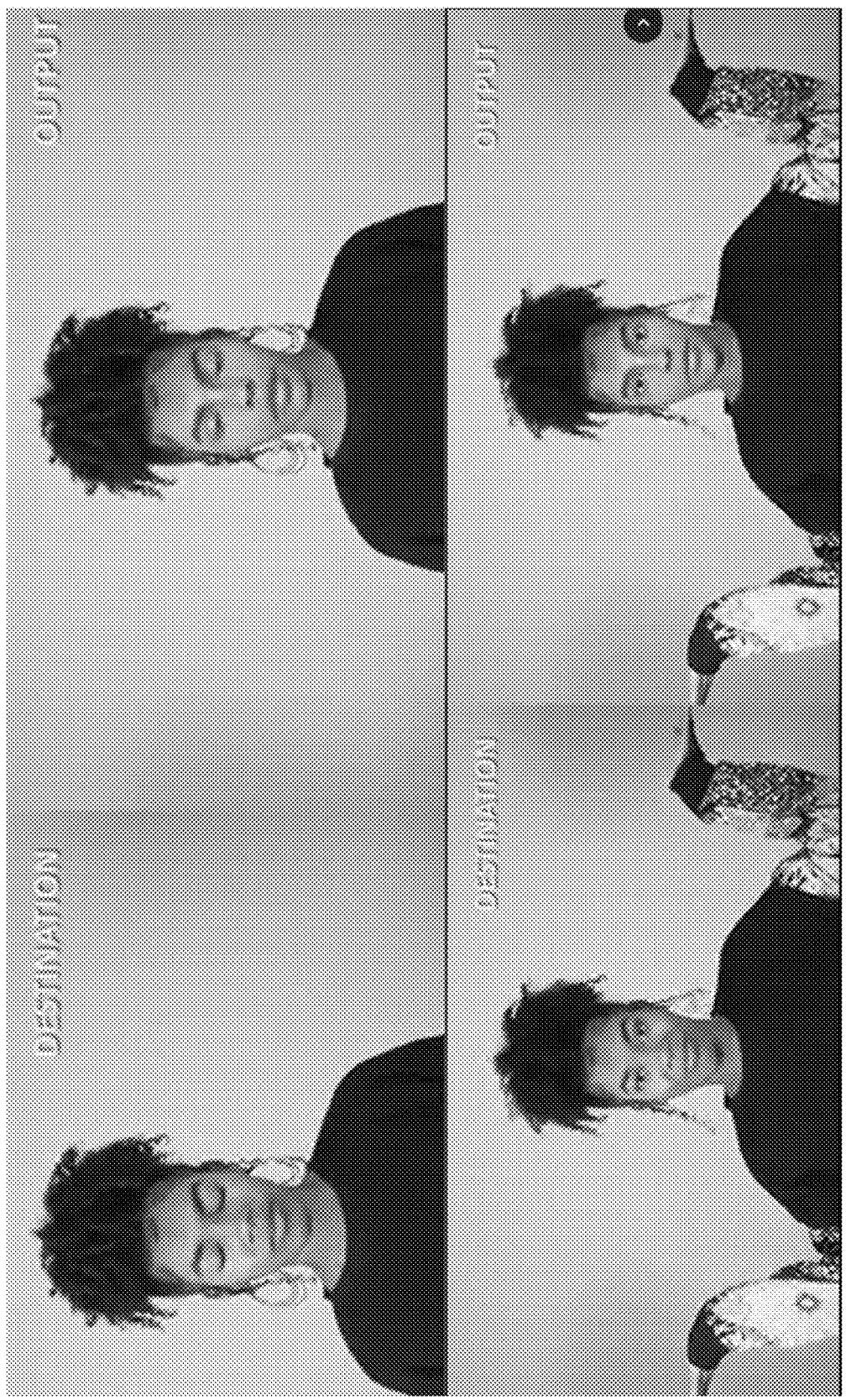
FIG. 9 illustrates example destination and output images generated by an autoencoder.

FIG. 9 illustrates example destination images and the resultant output images with the original face replaced using an autoencoder with a CGI face.

Optionally, the foregoing process may be utilized to perform manipulation on various facial or body features. For example, the foregoing process may be utilized to perform mouth manipulation, eye manipulation, body manipulation (optionally in combination with the face replacement process). Thus, for example the output of the process may generally maintain the integrity and likeness of the destination dataset, except as it relates to specified movements of specified facial or body features.

Conventionally, image processing operations, such as artificial intelligence engine training for identifying or swapping faces, or for performing face swapping, are complex for users to navigate. Therefore, conventionally, users may need to be highly skilled and trained. Disclosed herein are user interfaces that greatly simply the users experience in managing such image processing operations, and that reduce the need to navigate through multiple complex and confusing user interfaces.

Figure 6:
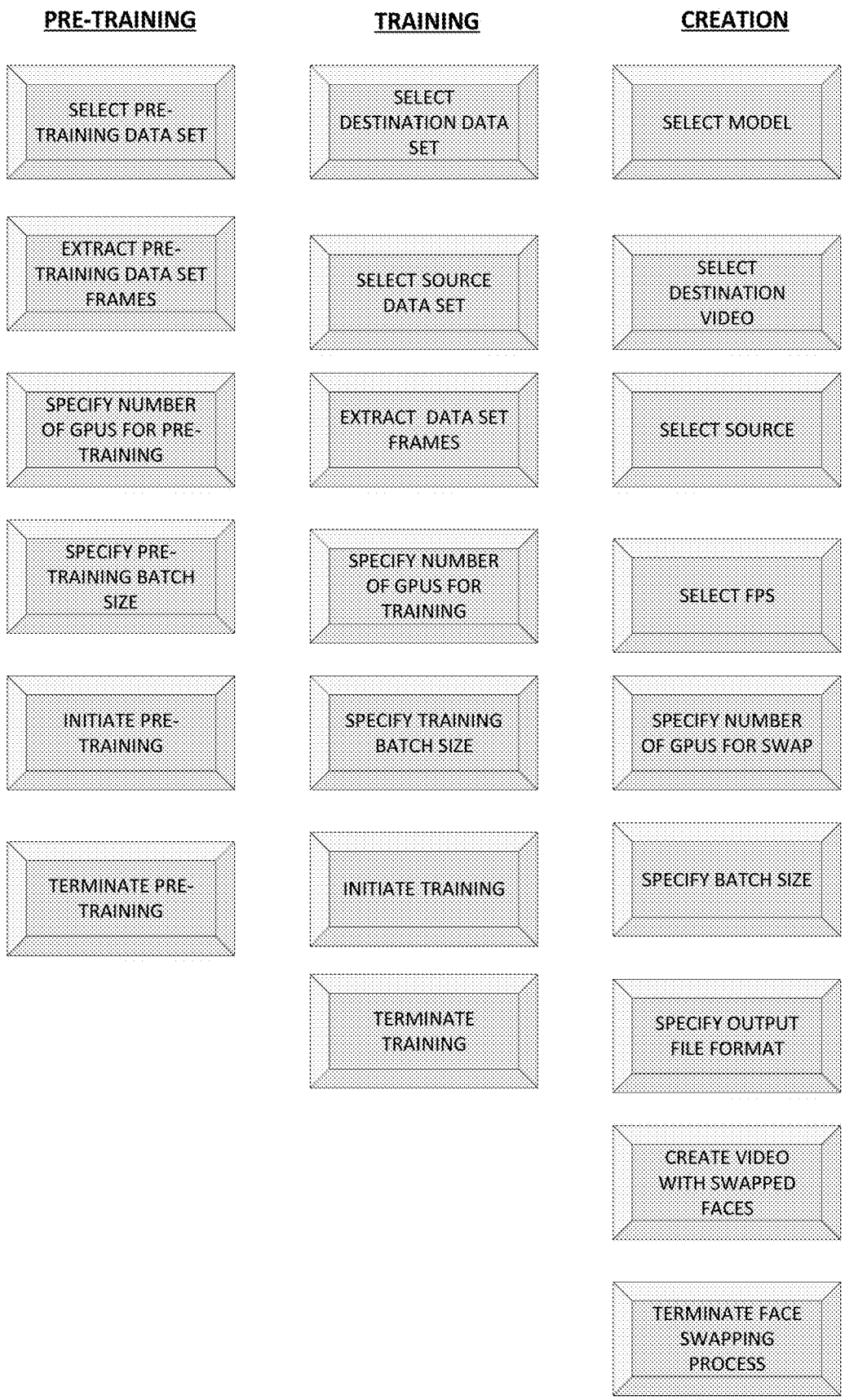
FIGS. 6 and 7 illustrate example user interfaces.

FIG. 6 illustrates such an example user interface. The example user interface includes controls organized in function sets, such as a pre-training set of controls, a training set of controls, and a output video creation set of controls. A similar user interface (including a pre-training set of controls, an extract pre-training control, a specify number of processing units for pre-training control, an initiate pre-training control, a terminate pre-training control, an initiate training control, a terminate training control, a select model control, select destination audio control, a select source audio control, select frame size) may be utilized to manage voice processing operations, such as the pre-training, training, and output voice creation. Other controls may include controls for using the trained autoencoders, controls for cleaning and preprocessing the image datasets, and/or the like. For example, noisy images may be identified and removed from the dataset. Optionally, noisy images may undergo an image de-noising process (using spatial domain filtering, variational denoising, transform techniques, CNN-based denoising methods, and/or using other techniques).

Optionally, the graphical user interface may include hidden layer controls that enable a user to specify and control, for the autoencoder, the number of hidden layers and/or the hidden layer width for each layer. Optionally, the user interface may enable other tunable features to be specified, such as the use of reflection padding (where values are padded with the "reflection" or "mirror" of the values directly in the opposite direction of the edge of the "to be padded" shape), use of zero padding, use of casual padding, user of replication padding, specification of convolution kernel size, the use of an intermediate network within the autoencoder, the use of normalization (e.g., spectral normalization), the use of learn masks during training, and/or the like. This enables the user to optimize the autoencoder architecture for the desired resolution and fidelity (e.g., increasing the hidden layer width when higher resolution and fidelity is needed, and decreasing the hidden layer width when lower resolution and fidelity is needed to thereby reduce memory and processing utilization).

The pre-training set of controls includes a select pre-training data set control, when activated, causes a file selection user interface to be presented. The file selection user interface may generate a list of pre-training data sets (e.g., videos or still images) from a pre-training data set data store. A user may select a desired pre-training data set to be used in training.

An extract pre-training control, when activated, causes frames from the selected pre-training data set to be extracted. A perform pre-training control, when activated, causes the extracted frames from the selected pre-training data set to be provided to an artificial intelligence engine (e.g., an autoencoder) for pre-training.

A specify number of GPUs for pre-training control, when activated, causes a user interface to be presented via which the user may enter the number of GPUs in a GPU array that are to be used in performing the pre-training. The user interface may display the number of GPUs available based on a determination as to GPU availability.

A specify pre-training batch size control, when activated, causes a user interface to be presented via which the user may enter the number of extracted pre-training images that are to be used for a given training iteration (e.g., 0-32). For example, a relatively larger batch size result in a learning engine that more accurately identifies and classifies faces and/or facial features (e.g., eyes, nose, mouth), but may need more processing time and/or computing resources.

An initiate pre-training control, when activated, initiates the pre-training process of the artificial intelligence engine (e.g., an autoencoder) as discussed elsewhere herein using the extracted frames from the selected training data set.

A terminate pre-training control, when activated, causes the pre-training process to be manually halted. For example, a user may want to interrupt a pre-training process because it is taking too long or because the real-time results indicate that the current level of pre-training is adequate.

The training set of controls includes a select destination data set control, when activated, causes a file selection user interface to be presented. The file selection user interface may generate a list of destination data sets (e.g., videos) from a destination data set data store. A user may select a desired destination data set to be used in training.

A select source data set control, when activated, causes a file selection user interface to be presented. The file selection user interface may generate a list of source data sets (e.g., videos) from a source data set data store. A user may select a desired source data set to be used in training.

An extract training control, when activated, causes frames from the selected destination and source data sets to be extracted.

A specify number of GPUs for training control, when activated, causes a user interface to be presented via which the user may enter the number of GPUs in a GPU array that are to be used in performing the training. The user interface may display the number of GPUs available based on a determination as to GPU availability.

A specify training batch size control, when activated, causes a user interface to be presented via which the user may enter the number of extracted training images that are to be used for a given training iteration (e.g., 0-32). For example, a relatively larger batch size result in a learning engine that more accurately performs face swapping, but may need more processing time and/or computing resources.

An initiate training control, when activated, initiates the training process of the artificial intelligence engine (e.g., an autoencoder, such as an generative adversarial network) as discussed elsewhere herein using the extracted frames from the selected destination and source data sets.

A terminate training control, when activated, causes the training process to be manually halted. For example, a user may want to interrupt a training process because it is taking too long or because the real-time results indicate that the current level of training is adequate.

The output video creation set of controls includes a select model control, when activated, causes a model selection user interface to be presented. The model selection user interface may generate a list of models (e.g., trained autoencoders) in a trained model data store. A user may select a desired trained model to be used in performing a face swapping operation. Optionally, a model search field may be provided which enables the user to enter or select search criteria (e.g., a name, tags, creation date, last edit date, etc.). A search engine may then locate models that match the search criteria and generate a search results list that is presented to the user and from which the user can select a desired model. The search may automatically be limited to models, rather than files and data objects in general.

A select destination video control, when activated, causes a file selection user interface to be presented. The file selection user interface may generate a list of destination videos from a destination data set data store. A user may select a desired destination video to be used in performing the face swapping operation.

A select source video control, when activated, causes a file selection user interface to be presented. The file selection user interface may generate a list of source videos from a source data set data store. A user may select a desired source video to be used in performing the face swapping operation.

A select FPS control, when activated, causes a frame per second selection user interface to be presented. For example, the user interface may include a menu of FPS choices (e.g., 24, 30, 60, 120 fps) from which the user may select and/or the user interface may include a field via which the user may manually enter a desired FPS.

A specify number of GPUs for swap control, when activated, causes a user interface to be presented via which the user may enter the number of GPUs in a GPU array that are to be used in performing the face swapping process. The user interface may display the number of GPUs available based on a determination as to GPU availability.

A specify batch size control, when activated, causes a user interface to be presented via which the user may enter the number of source and destination images that are to be used for a given swap iteration (e.g., 0-32).

A specify output file format control, when activated, causes an output file format user interface to be presented. For example, the user interface may include a menu of file choices from which the user may select, such as MPEG, JPEG, etc.

A create video with swapped faces control, when activated, causes the face swapping process, described elsewhere herein, to be performed.

A terminate face swapping process control, when activated, causes the face swapping process to be manually halted. For example, a user may want to interrupt a face swapping process because it is taking too long or because the real-time results indicate that the output is unsatisfactory.

Figure 7:
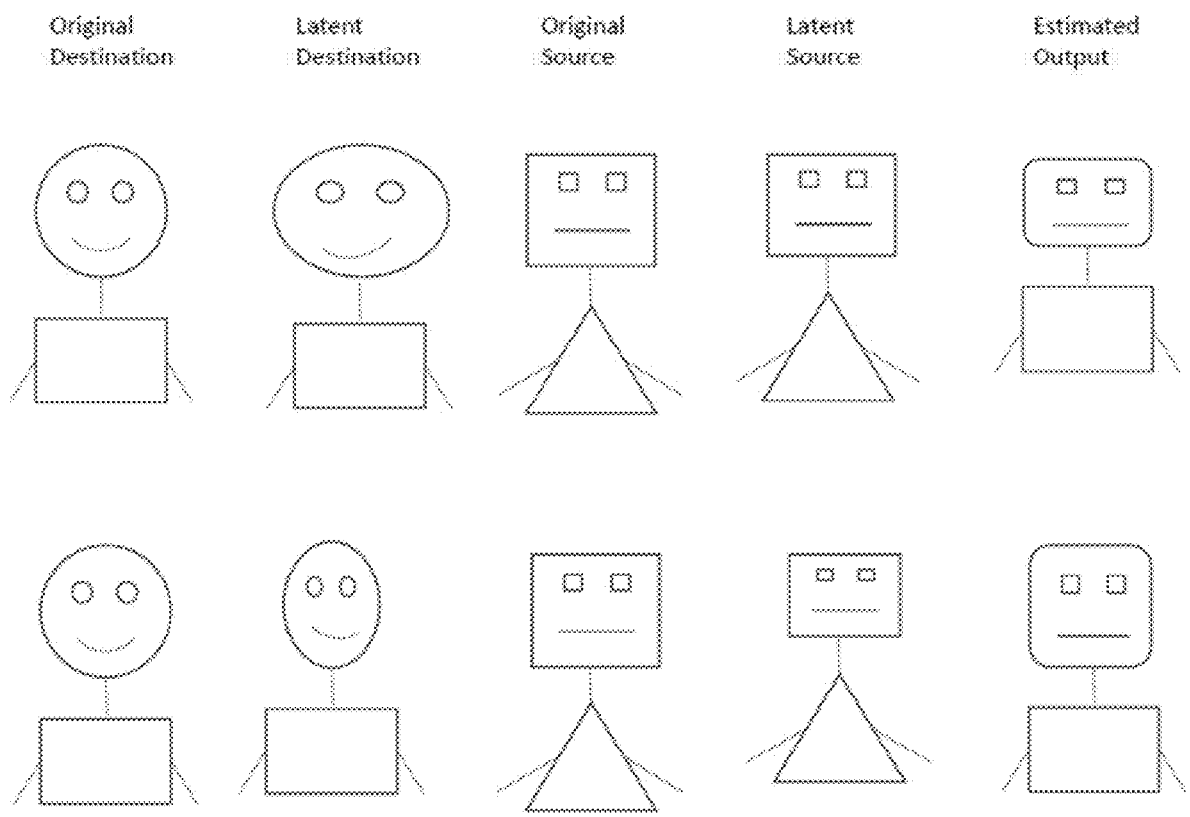

Optionally, during a face swapping process, a user interface may be provided that, in real time, shows at the same time the original destination image, the corresponding latent destination image, the original source image, the latent source image, and/or the estimated output of the face swapping process. FIG. 7 illustrates such an example user interface, including original destination, destination image, original source, latent source, and estimated output columns. Each row may represent another iteration. Other information presented via the user interface may include network loss values during training, predicted/learned masks for preview faces, and/or the like (which may optionally be presented via respective columns). This interface may enable a user to monitor the training progress and/or performance of an engine, such as an autoencoder, in real time. Based on the monitored progress, a user may elect to terminate a pre-training process, a training process, or a face swapping process.

Additionally, voice swapping may be performed using certain techniques disclosed herein. The voice swapping may be optionally performed in conjunction with face swapping. A first voice in an audio recording may be swapped with a second voice while maintaining the text and other features (e.g., emotions, etc.) from the first voice.

As will be described in greater detail herein, an autoencoder may be trained using voice samples. The autoencoder may include an input layer, an encoder configured to output a latent representation of the input voice data, and a decoder configured to attempt to reconstruct the input voice data from the latent representation of the input voice data. For example, the autoencoder may include a neural network. The neural network may be trained using frame error (FE) minimization criteria and the corresponding weights may be adjusted to minimize or reduce the error (e.g., the error squared over the source-target, training data set). Optionally, generative adversarial networks (GANs) may be utilized to capture and model the audio properties of a voice signal.

The generative adversarial networks may include a generator network that generates new data instances (e.g., synthesized voices in this example), while a discriminator network, evaluates the generated voice instances for authenticity (where the discriminator decides whether each reviewed voice instance belongs to the actual training dataset (e.g., of voices) or not. The discriminator takes in both real voices and fake voices generated by the generator and returns probabilities indicating the likelihood that the voice is real or a generated voice. The generator will continuously improve its generation of voices to "fool" the discriminator.

A source voice file exhibiting a plurality of vocal expressions and transitions between vocal expressions may be accessed. For example, the voice file may a subject dramatically reading a book, script, or the like. The voice file may include 10 kHz-20 kHz recording of phonetically-balanced read speech. The autoencoder or generator may be trained using the source voice file, and may also be trained using a destination voice file (e.g., of a destination voice dramatically reading a book, script, or the like, responding in an interview, etc.). By having source and/or destination training files specifically generated for the purposes of training autoencoders (rather than simply finding and utilizing random, pre-existing, non-purpose built, voice files posted on various websites or other public sources), the autoencoder training may be performed more quickly, using less processor and memory resources, while providing greater fidelity. The trained autoencoder or generator is used to generate an output where the voice in the destination voice record is swapped with the source voice, while preserving text and other characteristics (e.g., emotions, style, etc.) of the destination voice. For example, a male voice may be swapped with a female voice, or vice versa.

Initial training may be performed using utterances from many speakers (e.g., several hours of speech). For example, the training recordings may include hundreds or thousands of different speakers reading the same set of text (e.g., 5, 10, 20, or 30 sentences). The speakers may be of just once sex (e.g., male or female) or from both sexes (both male and female).

When the speech is being converted from a male to a female, the harmonics of the converted speech may be shifted to a lower frequency. Similarly, when the speech is being converted from a female to a male, the harmonics of the converted speech may be shifted to a higher frequency.

The input to the voice autoencoder and/or to the autoencoder decoder targets may be digitized raw waveforms, fundamental frequencies, and/or mel-frequency cepstral coefficients (extracted from the digitized waveforms) spectrogram (representing the voice spectrum). The mel-frequency cepstral coefficients (which may be periodically extracted from the voice recording (e.g., every 1 ms, every 3 ms, every 5 ms, every 10 ms, or other period) may be used as filter parameters for a filter used to derive fundamental frequency estimates. Optionally, the mel-cepstral coefficient vectors of the source voice and the target voice are aligned (e.g., using time warping) to account for the differences in duration of the utterances of the source and destination voices.

Optionally, a neural network may be utilized to perform a shift in pitch, frequency, and/or modulation, and/or synthesize audio with a similar pitch, frequency, and/or modulation to a source voice. A source audio dataset (e.g., shifted audio or synthesized audio) may be utilized to replace the content (speech or sounds) of a destination audio dataset (which may be associated with video content, such as that of the speaker of the audio in the audio dataset). An encoder may be utilized to generate spectrograms for both the source and target audio (e.g., source and target voices). Optionally, an encoder may be utilized to generate an autocorrelogram, a three-dimensional representation of sound where time, frequency and periodicity.

For example, the neural network may be utilized to manipulate the target spectrogram (or autocorrelogram) to bring it closer to the source spectrogram (or autocorrelogram). By way of further example, the neural network may be utilized to generate a new spectrogram the sound (e.g., speech) of the target but which resembles the pitch, frequency, and/or modulation of the source sound (e.g., speech). The neural network may utilize a trained vocoder for synthesizing the new target voice. For example, the vocoder may utilize a neural network architecture configured to perform audio synthesis by predicting a given audio sample at a time based on previously generated samples and certain conditions, such as a sequence of phonemes and/or fundamental frequencies.

Both the encoder and/or vocoder are optionally pre-trained on large datasets of human speech to provide generalized training. The encoder and/or vocoder may then be optionally trained and fine-tuned using the source audio. The neural network (which may be a dilated convolutional neural network) may optionally be used to synthesize the source audio (e.g., voice) spectrogram from text (to thereby perform text to speech conversion), and the neural network may be further used to adjust the pitch, frequency, and/or inflection of the source audio to match the target's pitch, frequency, and/or inflection. The model may be coarsely training on a large training dataset, the model may then undergo fine tuning training using a specific voice. Embeddings (low-dimensional, learned continuous vector representations of discrete variables) from the fine-tuned model may be used to fine tune the text-to-speech process.

Figure 11:
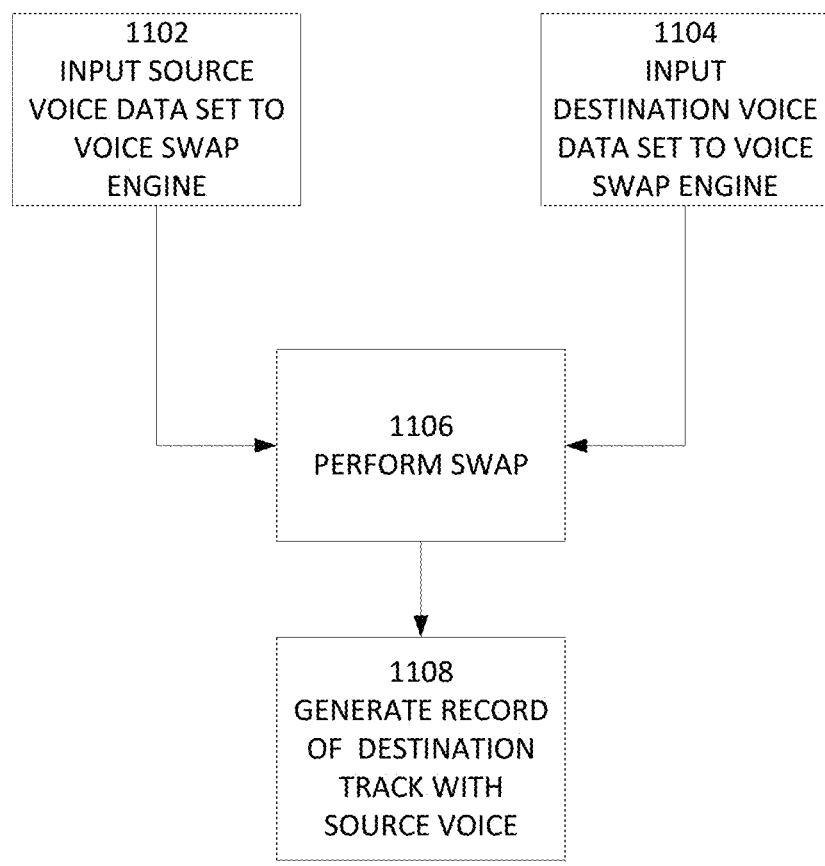
FIG. 11 illustrates an example voice swapping process.

FIG. 11 illustrates an example voice swap process. At block 1102, the source data set of voice records is provided to the artificial intelligence engine for training purposes. At block 1104, the destination data set of voice records is provided to the trained artificial intelligence engine. At block 1106, the trained artificial intelligence engine performs the voice swap (e.g., by feeding the destination data set voice records to the encoder trained using source and destination voice records and to the decoder trained using the source data records), where the output has the source voice while preserving the character (e.g., emotional prosody) and/or text of the voice in the destination voice records.

At block 1108, the output audio record may be generated with the source voice and the destination text and/or emotional prosody. The audio record may be played via an audio playback device (including a speaker). If the destination voice data was associated with a video track recorded of the person speaking in the source voice record, the voice in the output audio record may be synchronized with the lips and facial expressions of the person in the video.

Thus for example, one or more microphones (e.g., a stereo set of microphones) may be utilized to generate a source voice training set by capturing a source voice speaking a plurality of words using varying speech parameters (such as those described herein), wherein the captured source voice is captured to train autoencoders. An autoencoder may be trained using the source voice training set and using a destination voice speaking words using varying speech parameters.

Figure 12:
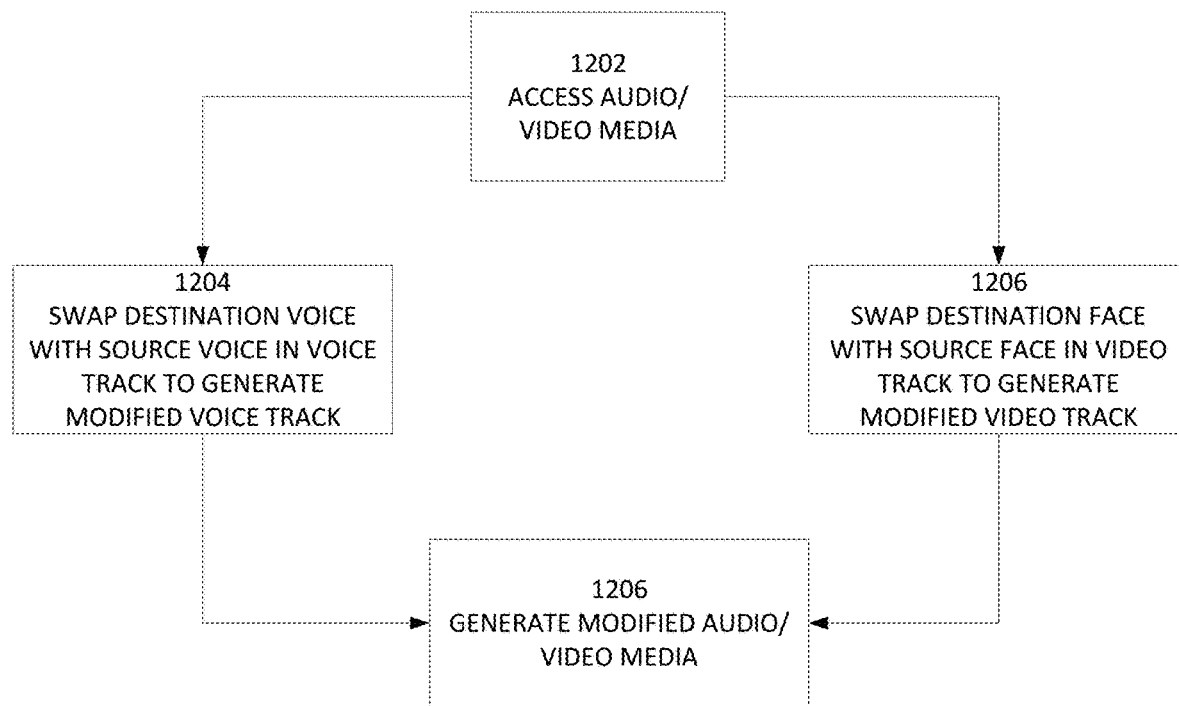
FIG. 12 illustrates an example process for swapping a voice and a face in audio/video media.

Referring to FIG. 12, the trained autoencoder and a face swapping network (e.g., where the face swapping network may be configured using architectures described elsewhere herein) may be used to process audio/video media (e.g., from a video sharing site, a television show, a movie, etc.). The audio/video media may comprise a video track and an audio track, wherein the audio track includes the destination voice speaking words and the video track includes images of a destination face having lips synchronized with the destination voice. At block 1202, the audio/video media is accessed (e.g., from local memory, remote storage, via a streaming source, or otherwise). At block 1204, the trained voice swapping autoencoder may be used to generate a modified audio track using the destination voice in the original audio track as an input, where the destination voice is swapped with the source voice, while preserving the words of the destination voice, so that the source voice is speaking the words of the destination voice (optionally with the intonation, frequency, and/or pitch of the destination voice, or optionally with a modified intonation, frequency, and/or pitch).

At block 1206, the face swapping network may be used to generate a modified video track wherein the face swapping network replaces the destination face likeness with a source face likeness while preserving the facial expressions of the destination face.

At block 1208, the modified video track and the modified audio track may be used to generate modified audio/video media, optionally with the destination head (e.g., hair, ears, hat etc.) having the source face likeness speaking the destination voice words with certain destination voice characteristics (e.g., inflection, pacing, etc.) but using the source voice. The modified audio track may be synchronized with the modified video track, so that the source face (on the destination head) is speaking using the source voice, but with the facial and vocal expressions of the destination face and destination voice. The modified audio/video media may then be played by a media player and/or distributed (e.g., via a streaming platform, via a download platform, via physical memory media, or otherwise) for playing or further editing by user devices.

Thus, systems and methods are described herein that perform face swapping operations in a more computer-resource and time efficient manner, while providing a more realistic and higher resolution output than currently available conventional methods. It is understood that although reference may be made wherein to face swapping for illustrative purposes, the disclosed systems an method may be used to swap other items instead of or in addition to human faces.

The disclosed processes may be performed in whole or in part by a user device, a local system, and/or a cloud-based system. For example, some or all of a given disclosed process may be executed by a secure, cloud based system comprised of co-located and/or geographically distributed server systems (which may include cloud-based GPU systems). Information may be received by the cloud-based system from one or more terminals. A terminal may include or be connected (via a wireless or wired connection) to one or more sensors, such as one or more microphones, one or more cameras (e.g., front facing and/or rear facing cameras, and/or the like. A terminal may include a display, a wired network interface, a wireless local network interface and/or wireless cellular interface.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An electronic image processing system, comprising:
    a network interface;
    at least one computing device;
    computer readable memory including instructions operable to be executed by the at least one computing device to perform a set of actions, configuring the at least one computing device to:
        access captured images of a plurality of facial expressions of a first CGI face and transitions between facial expressions from a plurality of different angles, wherein the captured images are captured to train autoencoders;
        train a pre-trained autoencoder using the captured images that include the first CGI face with different facial expressions captured at different angles, and using destination images that include a first real face, wherein the autoencoder comprises:
            an input layer;
                an encoder including at least one hidden layer;
                wherein the encoder is configured to output a latent image from a corresponding input image;
            a decoder configured to attempt to reconstruct the input image from the latent image; and
        use the trained autoencoder to generate an output using destination images as an input where the first real face likeness in the destination images is swapped with the likeness of the first CGI face, while preserving expressions of the first real face.

2. The electronic image processing system as defined in claim 1, wherein the autoencoder includes one or more intermediate networks configured to enhance abstract representation learning and wherein the trained autoencoder output has a HD, 4K UHD, 4K, 8K, or 16K resolution.

3. The electronic image processing system as defined in claim 1, wherein the electronic image processing system is configured to perform operations comprising:
    determining an alignment difference between at least one source image in a training set of source images and at least one destination image; and based at least on the determined alignment difference determining if an additional image is to be obtained for the training set of source images.

4. The electronic image processing system as defined in claim 1, wherein the electronic image processing system is configured to perform operations comprising:
   determining an alignment difference between at least one source image in a training set of source images and at least one destination image; and
   based at least on the determined alignment difference determining if at least one source image is to be deleted from the training set of source images.

5. The electronic image processing system as defined in claim 1,
   wherein the first CGI face is generated based on a physical face captured using a neural network, photogrammetry, laser scanning, and/or light detection and ranging.

6. The electronic image processing system as defined in claim 1, further comprising:
   an array of graphics processing units and/or an array of central processing units; and
   a task allocator configured to allocate pre-training tasks, training tasks, and face swapping tasks among the graphics processing units in the array of graphics processing units and/or among the central processing units in the array of central processing units.

7. The electronic image processing system as defined in claim 1, wherein the electronic image processing system is configured to extract destination images from a video, locate a given face within the extracted destination images, align the located given faces, and store timing data associated with when in the video a given face was identified.

8. The electronic image processing system as defined in claim 1, wherein the electronic image processing system is configured to provide a user interface comprising a training set of controls and an output video creation set of controls, wherein:
   the training set of controls includes a control enabling selection of a destination data set, a control enabling specification of a source data set, a control enabling specification of a training batch size and a control initiating training of the autoencoder.

9. The electronic image processing system as defined in claim 1, wherein the electronic image processing system is configured to provide a user interface comprising a set of controls enabling a user to:
   specify a hidden layer width for the autoencoder,
   specify a quantity of hidden layers for the autoencoder,
   specify whether padding is to be utilized,
   specify a convolutional kernel size,
   specify whether the autoencoder is utilize an intermediate neural network,
   specify whether and/or which type of normalization is to be used, and
   specify whether a learn mask is to be used.

10. The electronic image processing system as defined in claim 1, wherein the electronic image processing system is configured to provide a user interface comprising:
    an original destination facial image column and a corresponding latent destination facial image column configured to display corresponding facial images generated by the autoencoder encoder,
    an original source facial image column and a corresponding latent source facial image column configured to display corresponding facial images generated by the autoencoder encoder,
    an output facial image column configured to display a face-swapped image from the autoencoder,
    network loss values, and
    masks.

11. A computer-implemented method comprising:
    under control of a hardware computing device configured with specific computer-executable instructions:
      training an autoencoder using:
        a generated training source data set source images comprising facial images of a source face from a plurality of different angles and/or with a variety of different lighting characteristics, the source facial images exhibiting a plurality of facial expressions and transitions between facial expressions, and
        destination images that include a destination face, wherein the autoencoder comprises:
          an input layer;
          an encoder including at least one hidden layer, wherein the encoder is configured to output a latent image from a corresponding input image;
          a decoder configured to attempt to reconstruct the input image from the latent image; and
      using the trained autoencoder to generate an output using the destination images, where the destination face likeness in the destination images is swapped with the source face likeness, while preserving expressions of the destination face.

12. The computer-implemented method as defined in claim 11, wherein the autoencoder includes one or more intermediate networks configured to enhance abstract representation learning and wherein the trained autoencoder output has a HD, 4K UHD, 4K, 8K, or 16K resolution.

13. The computer-implemented method as defined in claim 11, the method further comprising:
    determining an alignment difference between at least one source image in at least one training set of source images and at least one destination image; and
    based at least on the determined alignment difference, determining if an additional image is to be obtained for the at least one training set of source images.

14. The computer-implemented method as defined in claim 11, the method further comprising:
    determining an alignment difference between at least one source image from at least one training set of source images and at least one destination image; and
    based at least on the determined alignment difference, determining if at least one source image is to be deleted from the at least one training set of source images.

15. The computer-implemented method as defined in claim 11,
    wherein the training source data set comprising facial images of the source face is generated based at least in part on a physical face captured using a neural network, photogrammetry, laser scanning, and/or light detection and ranging.

16. The computer-implemented method as defined in claim 11, wherein training the autoencoder further comprises:
    training the encoder using both the training source data set images and the destination images and training the decoder using the training source data set images.

17. The computer-implemented method as defined in claim 11, the method further comprising:
    allocating training tasks and face swapping tasks among graphics processing units in an array of graphics processing units and/or among central processing units in an array of central processing units.

18. The computer-implemented method as defined in claim 11, further comprising:
enabling a voice track associated with the destination images to be synchronized with the source face in the output using the preserved expressions of the destination face.

19. The computer-implemented method as defined in claim 11, the method further comprising:
extracting the destination images from a video;
locating instances of the destination face within the extracted destination images; and
aligning the located instances of the destination faces.

20. The computer-implemented method as defined in claim 11, the method further comprising:
providing a user interface comprising a training set of controls and an output video creation set of controls, wherein:
the training set of controls includes a control enabling selection of a destination data set, a control enabling specification of a source data set, a control enabling specification of a training batch size and a control initiating training of the autoencoder; and
the output video creation set of controls a model selection control enabling selection of a trained autoencoder, a control enabling a destination data set to be selected, a control enabling a source data set to be selected, a control enabling an output file format to be specified, and control initiating creation of an output video.

21. The computer-implemented method as defined in claim 11, the method further comprising:
providing a user interface comprising a set of controls enabling a user to specify, for the autoencoder:
a hidden layer width,
a quantity of hidden layers,
whether padding is to be utilized,
a convolutional kernel size,
whether the autoencoder is utilize an intermediate neural network,
whether and/or which type of normalization is to be used, and
whether a learn mask is to be used.

22. The computer-implemented method as defined in claim 11, the method further comprising:
providing a user interface comprising:
an original destination facial image column and a corresponding latent destination facial image column configured to display corresponding facial images generated by the autoencoder encoder,
an original source facial image column and a corresponding latent source facial image column configured to display corresponding facial images generated by the autoencoder encoder,
an output facial image column configured to display a face-swapped image from the autoencoder,
network loss values, and
masks.

23. The computer-implemented method as defined in claim 11, the method further comprising:
pre-training the autoencoder using a plurality of images of a plurality of faces prior to training the autoencoder.

24. An electronic image processing system, comprising:
at least one computing device;
computer readable memory including instructions operable to be executed by the at least one computing device to perform a set of actions, configuring the at least one computing device to:
access a training set of source images, the training set of source images comprising facial images of a source face from a plurality of different angles and/or with a variety of different lighting characteristics, the source facial images exhibiting a plurality of facial expressions and transitions between facial expressions;
determining an alignment difference between at least one source image in the training set of source images and at least one destination image; and
based at least on the determined alignment difference, determine if an additional image is to be obtained for the training set of source images;
based at least in part on determining that an additional image is to be obtained for the training set of source images, access the additional image; and
use a trained autoencoder to generate an output using destination images comprising a destination face as an input where the destination face likeness in the destination images is swapped with the likeness of the source face, while preserving expressions of the destination face, wherein the trained the autoencoder comprises:
an input layer;
an encoder including at least one hidden layer, wherein the encoder is configured to output a latent image from a corresponding input image;
a decoder configured to attempt to reconstruct the input image from the latent image.

25. The electronic image processing system as defined in claim 24, wherein the electronic image processing system is configured to perform operations comprising:
determining an alignment difference between a first source image in the training set of source images and at least one destination image; and
based at least on the determined alignment difference between that first source image and the at least one destination image, determining if the first source image is to be removed from the training set of source images.

26. The electronic image processing system as defined in claim 24,
wherein the source face is a CGI face generated based on a physical face captured using a neural network, photogrammetry, laser scanning, and/or light detection and ranging.

27. The electronic image processing system as defined in claim 24, further comprising:
an array of graphics processing units and/or an array of central processing units; and
a task allocator configured to allocate pre-training tasks, training tasks, and face swapping tasks among the graphics processing units in the array of graphics processing units and/or among the central processing units in the array of central processing units.

28. The electronic image processing system as defined in claim 24, wherein the electronic image processing system is configured to extract destination images from a video, locate a given face within the extracted destination images, align the located given faces, and store timing data associated with when in the video a given face was identified.

29. The electronic image processing system as defined in claim 24, wherein the electronic image processing system is configured to provide a user interface comprising a training set of controls and an output video creation set of controls, wherein:

the training set of controls includes a control enabling selection of a destination data set, a control enabling specification of a source data set, a control enabling specification of a training batch size and a control initiating training of the autoencoder.

30. The electronic image processing system as defined in claim 24, wherein the electronic image processing system is configured to provide a user interface comprising a set of controls enabling a user to:

specify a hidden layer width for the autoencoder,
specify a quantity of hidden layers for the autoencoder,
specify whether padding is to be utilized,
specify a convolutional kernel size,
specify whether the autoencoder is utilize an intermediate neural network,
specify whether and/or which type of normalization is to be used, and/or
specify whether a learn mask is to be used.

* * * * *

UNITED STATES PATENT AND TRADEMARK OFFICE
CERTIFICATE OF CORRECTION

Page 1 of 2

PATENT NO. : 10,949,715 B1
APPLICATION NO. : 16/884485
DATED : March 16, 2021
INVENTOR(S) : Cody Gustave Berlin It is certified that error appears in the above-identified patent and that said Letters Patent is hereby corrected as shown below:

On the Title Page

Column 1, Line 16, below "U.S.C. 154(b) by 0 days." insert -- This patent is subject to a terminal disclaimer. --.

Column 2, item (45), Date of Patent, Line 1, before "Mar. 16, 2021" insert -- * --.

Page 2, Column 2, Other Publications, Line 19, delete "youtu.be." and insert -- youtube. --.

In the Drawings

Drawing sheet 6 of 14, FIG. 4, reference numeral 414, Line 2, delete "X+Xincrement" and insert -- X+X increment --.

Drawing sheet 6 of 14, FIG. 4, reference numeral 414, Line 4, delete "Y+Yincrement" and insert -- Y+Y increment --.

Drawing sheet 14 of 14, FIG. 12, reference numeral 1206, Line 9, delete "1206" and insert -- 1208 --.

In the Specification

Column 8, Line 7, delete "the trained the" and insert -- the trained --.

Column 8, Line 20, delete "FIG." and insert -- FIGS. --.

Column 8, Line 63, delete "8k" and insert -- 8K --.

Column 13, Lines 4-5, delete "-Optionally" and insert -- Optionally --.

Column 14, Line 12, delete "-Optionally" and insert -- Optionally --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*

Column 14, Line 60, delete "functions" and insert -- functions. --.

Column 15, Lines 33-34, delete "classifications" and insert -- classifications. --.

Column 19, Line 3, delete "threshold)" and insert -- threshold). --.

Column 20, Line 28, delete "(where" and insert -- where --.

Column 20, Line 45, delete "(FCNs))" and insert -- (FCN)) --.

Column 22, Line 49, delete "a the" and insert -- the --.

Column 27, Line 15 (approx.), delete "(where" and insert -- where --.

Column 27, Line 62, delete "(which" and insert -- which --.

Column 29, Line 57, delete "an method" and insert -- and methods --.

Column 30, Line 3, delete "(e.g.," and insert -- e.g., --.

In the Claims

Column 36, Line 24, Claim 24, delete "the trained the" and insert -- the trained --.